(12) United States Patent
Camus et al.

(10) Patent No.: US 12,093,897 B2
(45) Date of Patent: Sep. 17, 2024

(54) EMPLOYEE INTERACTION MANAGEMENT BASED ON PREDICTIVE ANALYSIS

(71) Applicant: Kyndryl, Inc., New York, NY (US)

(72) Inventors: Kelly Camus, Durham, NC (US);
Shikhar Kwatra, San Jose, CA (US);
Al Chakra, Apex, NC (US); Jun Zhu,
Cary, NC (US)

(73) Assignee: Kyndryl, Inc., New York, NY (US)

( * ) Notice: Subject to any disclaimer, the term of this patent is extended or adjusted under 35 U.S.C. 154(b) by 253 days.

(21) Appl. No.: 17/663,096

(22) Filed: May 12, 2022

(65) Prior Publication Data

US 2023/0368141 A1    Nov. 16, 2023

(51) Int. Cl.
*G06Q 10/10*    (2023.01)
*G06N 20/20*    (2019.01)
*G06Q 10/0633*  (2023.01)

(52) U.S. Cl.
CPC ........... *G06Q 10/103* (2013.01); *G06N 20/20* (2019.01); *G06Q 10/0633* (2013.01)

(58) Field of Classification Search
CPC ............. G06Q 10/103; G06Q 10/0633; G06Q 10/063112; G06Q 10/06398; G06Q 10/1053; G06N 20/20; G06N 3/0442; G06N 5/01; G06N 7/01
See application file for complete search history.

(56) References Cited

U.S. PATENT DOCUMENTS

| | | |
|---|---|---|
| 7,240,055 B2 | 7/2007 | Grasso et al. |
| 7,310,626 B2 | 12/2007 | Scarborough |
| 7,644,144 B1 | 1/2010 | Horvitz et al. |
| 8,566,133 B2 | 10/2013 | Umamahewsaran et al. |
| 2002/0128894 A1 | 9/2002 | Farenden |
| 2002/0194117 A1 | 12/2002 | Nabe et al. |

(Continued)

FOREIGN PATENT DOCUMENTS

| | | |
|---|---|---|
| CN | 112330016 | 2/2021 |
| WO | WO2014084829 | 6/2014 |

OTHER PUBLICATIONS

Stacking in Machine Learning, May 20, 2019, Geeks for Geeks, https://web.archive.org/web/20220106080905/https://www.geeksforgeeks.org/stacking-in-machine-learning/ (Year: 2019).*

(Continued)

*Primary Examiner* — Florian M Zeender
*Assistant Examiner* — Emily M. Kraisinger
(74) *Attorney, Agent, or Firm* — CANTOR COLBURN LLP; Erik Swanson

(57) ABSTRACT

Methods, computer program products, and systems are presented. The method, computer program products, and systems can include, for instance: receiving personal inputs regarding a first individual, the first individual previously having given informed consent, automatically generating a work profile for the first individual based on the plurality of personal inputs; based on the work profile of the first individual and a preexisting work profile of a second individual, predicting a work affinity indicator for the first individual and the second individual, the predicting including using an affinity model trained via ensemble learning; and providing the work affinity indicator to a user for optional consideration in making a work-related or employment-related decision.

17 Claims, 11 Drawing Sheets

(56) References Cited

U.S. PATENT DOCUMENTS

| | | | |
|---|---|---|---|
| 2009/0234686 A1* | 9/2009 | Chakra | G06Q 50/265 |
| | | | 705/325 |
| 2009/0248599 A1 | 10/2009 | Hueter et al. | |
| 2010/0287111 A1 | 11/2010 | Scarborough et al. | |
| 2013/0046704 A1 | 2/2013 | Patwa et al. | |
| 2014/0279628 A1 | 9/2014 | Straznitskas | |
| 2014/0358810 A1 | 12/2014 | Hardtke et al. | |
| 2015/0006213 A1 | 1/2015 | Heier | |
| 2017/0243166 A1 | 8/2017 | Montgomery et al. | |
| 2018/0137415 A1* | 5/2018 | Steinberg | G06N 7/01 |
| 2018/0218328 A1* | 8/2018 | Kenthapadi | G06Q 10/063112 |
| 2020/0134541 A1* | 4/2020 | Ebner | G06N 20/00 |
| 2021/0004748 A1 | 1/2021 | Ravi | |

OTHER PUBLICATIONS

Wikipedia, "Connectionist temporal classification", Https://en.wikipedia.org/w/index.php?title=Connectionist temporal_classification&oldid=1041961914, Sep. 2, 2021, (1 page).

Wikipedia, "n-gram", https://en.wikipedia.org/w/index.php?title=N-gram&oldid=1054737911, Nov. 11, 2021, (10 pages).

Wikipedia, "Mel-frequency cepstrum", https://en.wikipedia.org/w/index.php?title=Mel-frequency_cepstrum&oldid=1021923846, May 7, 2021, (4 pages).

Wikipedia, "Student's t-distribution", https://en.wikipedia.org/w/index.php?title=Student%27s_t-distribution&oldid=1059888640, Dec. 12, 2021, (22 pages).

Wikipedia, "Pearson correlation coefficient", https://en.wikipedia.org/w/index.php?title=Pearsoncorrelation_coefficient&oldid=1059450181, Dec. 9, 2021, (13 pages).

Wikipedia, "Ensemble learning", https://en.wikipedia.org/w/index.php?title=Ensemblelearning&oldid=1060522781, Dec. 16, 2021, (10 pages).

Girshick, Ross, "Fast R-CNN", ICCV 2015, Sep. 27, 2015, (9 pages).

Ismiguzel, Idil, "Practical Guide to Ensemble Learning", Towards Data Science, Jul. 30, 2021, (14 pages).

Patwardhan, Sai, "Simple Understanding and Implementation of KNN Algorithm!", Apr. 21, 2021, (7 pages).

IBM Cloud Education, "What is Machine Learning?", IBM_.ibm.com/cloud/learn/machine-learning, Jul. 15, 2020, (12 pages).

Sayad, Saed, "K Nearest Neighbors—Classification", https://www.saedsayad.com/knearestneighbors.htm, (no date information available), (2 pages).

Stuart, Alix, "Personality tests and the rise of the hiring machines", Feb. 2, 2015, (3 pages).

Hyper Island, "Ctrl + Alt + Del," https://www.hyperisland.com/community/news/ hyper-island-executive-study, (no date information available), (5 pages).

Byun, Gukdo et al., "Sustaining Collaborative Effort in Work Teams: Exchange Ideology and Employee Social Loafing", Aug. 3, 2020, (15 pages).

\* cited by examiner

EMPLOYEE INTERACTION MANAGEMENT BASED ON PREDICTIVE ANALYSIS

BACKGROUND

Recommendation systems in the human resources (HR) realm typically involve employee selection, either hiring external candidates for the right job or moving current employees into a more suitable job. These systems base their recommendations on the match between various data sources provided by the person (e.g., job application, resume) and the characteristics of the particular job.

What is lacking in such systems or is not taken into account is how employees will interact with others once in the job. While an employee might be an appropriate fit for a job, that does not mean that the employee will be the ideal match for the team. There can be a mismatch between an employee and a supervisor or between an employee and a co-worker. This misalignment can negatively impact employee job performance causing serious problems in the workplace.

SUMMARY

Shortcomings of the prior art are overcome, and additional advantages are provided, through the provision, in one aspect, of a method. The method can include, for example: receiving a plurality of personal inputs regarding a first individual after informed consent is given by the first individual; automatically generating a first work profile for the first individual based on the plurality of personal inputs; based on the first work profile of the first individual and a preexisting second work profile of a second individual, predicting a first work affinity indicator for the first individual and the second individual, wherein the predicting comprises using an affinity model trained via ensemble learning; and providing the first work affinity indicator to a user for optional consideration in making a work-related or employment-related decision.

In another aspect, a system can be provided. The system can include, for example a memory. In addition, the system can include one or more processor in communication with the memory. Further, the system can include program instructions stored in the memory and executable by the at least one processor via the memory to perform a method. The method can include, for example: receiving a plurality of personal inputs regarding a first individual after informed consent is given by the first individual; automatically generating a first work profile for the first individual based on the plurality of personal inputs; based on the first work profile of the first individual and a preexisting second work profile of a second individual, predicting a first work affinity indicator for the first individual and the second individual, wherein the predicting comprises using an affinity model trained via ensemble learning; and providing the first work affinity indicator to a user for optional consideration in making a work-related or employment-related decision.

In a further aspect, a computer program product can be provided. The computer program product can include a computer readable storage medium readable by one or more processing circuit and storing instructions for execution by one or more processor for performing a method. The method can include, for example: receiving a plurality of personal inputs regarding a first individual after informed consent is given by the first individual; automatically generating a first work profile for the first individual based on the plurality of personal inputs; based on the first work profile of the first individual and a preexisting second work profile of a second individual, predicting a first work affinity indicator for the first individual and the second individual, wherein the predicting comprises using an affinity model trained via ensemble learning; and providing the first work affinity indicator to a user for optional consideration in making a work-related or employment-related decision.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
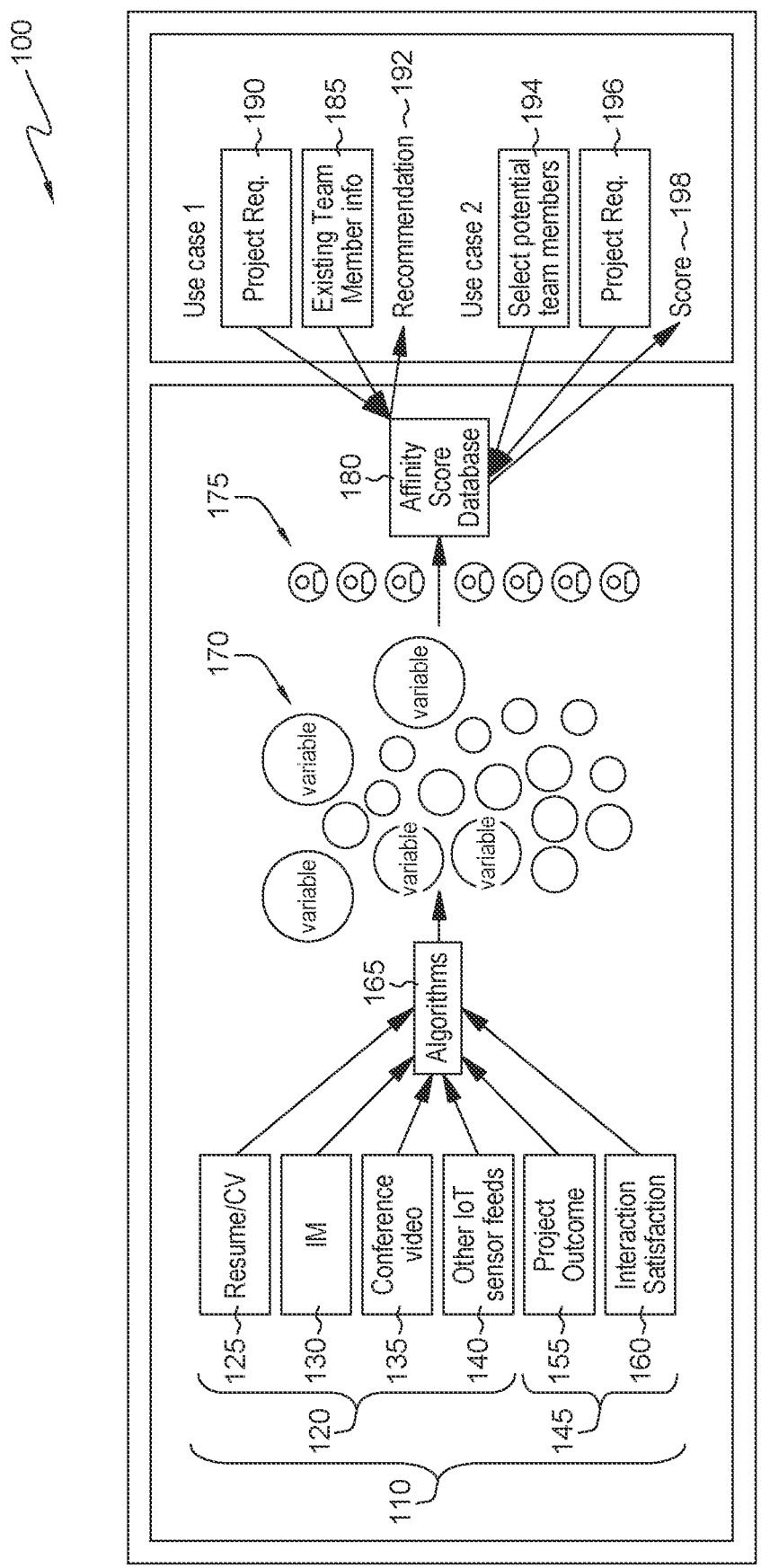
FIG. 1 is a high-level hybrid block diagram and flow diagram of one example of operation of a system, in accordance with one or more aspect of the present invention.

In a modern survey of hundreds of CEOs, hiring managers and employees, about three quarters of the respondents believed that the totality of qualities and traits, character and/or behavior, particular to an individual is the most critical indicator for placing the right person with the job, while about one quarter of the respondents chose skill set. Such results reveal the importance of fitting into today's workforce culture. While managers can rely on things like a resume and personal interaction to draw a hunch whether a candidate is a good fit for a job and the team, work style and other observable phenomena (e.g., answers from an individual to an IQ test) that may provide a connection to theoretic attributes (e.g., intelligence), are more often hard to accurately measure using standard tools.

While tests measuring such things as intelligence, aptitude, work style and interests through questionnaire and scores may assist in theory, these tests are often susceptible of being deciphered easily by the participants. The answers provided by the participants are thus easily skewed, resulting in an inaccurate results.

Disclosed herein, in one or more aspects, is a recommendation system that matches the work affinity of two individuals, such as two employees or a prospective hire and existing employee. In addition, in one embodiment, the invention can assess which employees work best together based on predictive analysis, which employees are likely to collaborate well together to produce the best results, as well as to predict potential future interactions between employees. These capabilities could help prevent conflict within the workplace and increase morale among employees leading to improved team performance.

As used herein, the term "work affinity indicator" refers to a qualitative or quantitative indicator providing a relative degree to which one individual works well in an employment setting with another individual. In one example, the work affinity indicator can take the form of a work affinity score, e.g., 1-10 with 1 being a lowest affinity and 10 being a highest affinity.

As used herein, the term "work style" in the context of a work environment refers to, for example, whether an individual is data-oriented, detailed-oriented, emotionally oriented, ideation-oriented, etc., which can be determined, for example, via the individual completing a work style assessment (e.g., a personality assessment) and/or an evaluation of the individual's preferred mode of communication (e.g., in-person, via video chat, instant message), how the individual deals with conflict, whether the person prefers more structure when planning their work day, etc.

As used herein, the term "work profile" refers to a profile of an individual, such as an employee or prospective employee. Such a profile may be generated based on a work style determined using the types of inputs discussed subsequently with respect to FIG. 1. A work profile includes, for example, any preexisting work profile of an individual with information previously opted into; in other words, the individual previously gave informed consent regarding the information. A work profile also includes, for example, a new work profile of a prospective employee, as well as an updated preexisting work profile based on new or updated inputs.

As used herein, the term "informed consent" refers to an individual agreeing to allow the intake and processing of information regarding the individual after having been apprised of how such information would be used and whether and to what extent the information would be retained. Non-limiting examples of the types of information include, for example, those given below in the description of FIG. 1.

As used herein, the term "personal inputs" collectively refers to any type of information regarding an individual, based on the individual giving informed consent as defined herein, that is useful in evaluating the individual for a work-related or employment-related decision. Non-limiting examples of personal inputs include those described subsequently with respect to FIG. 1.

The invention, in one embodiment, employs ensemble learning to develop a stacked Machine Learning (ML) layer over multiple datasets in order to optimize the recommendation model over the training period and generate customized output in context and known information.

However, using a machine learning algorithm, for example, a supervised machine learning algorithm, such data regarding the participant/employee can be obtained and refined over time. Many layers of variables such as daily interactions, communications, behavior traits may be taken into account in order to produce a more objective and reliable result without too much human interference and influence.

Machine learning (ML), deep learning, and neural networks are all sub-fields of artificial intelligence. However, deep learning is actually a sub-field of machine learning, and neural networks is a sub-field of deep learning. The way in which deep learning and machine learning differ is in how each algorithm learns. Deep learning automates much of the feature extraction piece of the process, eliminating some of the manual human intervention required and enabling the use of larger data sets. Deep learning can be thought of as machine learning that is scalable. Classical, or "non-deep", machine learning is more dependent on human intervention to learn. Human experts determine the set of features to understand the differences between data inputs, usually requiring more structured data to learn.

"Deep" machine learning can leverage labeled datasets, also known as supervised learning, to inform its algorithm, but it doesn't necessarily require a labeled dataset. It can ingest unstructured data in its raw form (e.g. text, images), and it can automatically determine the set of features which distinguish different categories of data from one another. Unlike machine learning, it doesn't require human intervention to process data, allowing us to scale machine learning in more interesting ways. Deep learning and neural networks are primarily credited with accelerating progress in areas, such as computer vision, natural language processing (NPL), and speech recognition.

Neural networks, or artificial neural networks (ANNs), are comprised of a node layers, containing an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network. The "deep" in deep learning refers to the depth of layers in a neural network. A neural network that consists of more than three layers—which would be inclusive of the inputs and the output—can be considered a deep learning algorithm or a deep neural network. A neural network that only has two or three layers is just a basic neural network.

The learning system of a machine learning algorithm has been broken out into three main parts:

A Decision Process: In general, machine learning algorithms are used to make a prediction or classification. Based on some input data, which can be labelled or unlabeled, a given ML algorithm will produce an estimate about a pattern in the data.

An Error Function: An error function serves to evaluate the prediction of the model. If there are known examples, an error function can make a comparison to assess the accuracy of the model.

A Model Optimization Process: If the model can fit better to the data points in the training set, then weights are adjusted to reduce the discrepancy between the known example and the model estimate. The algorithm will repeat this evaluate and optimize process, updating weights autonomously until a threshold of accuracy has been met.

Machine learning classifiers fall into three primary categories: supervised machine learning; unsupervised machine learning; and semi-supervised machine learning.

Supervised learning, also known as supervised machine learning, is defined by its use of labeled datasets to train algorithms that to classify data or predict outcomes accurately. As input data is fed into the model, it adjusts its weights until the model has been fitted appropriately. This occurs as part of the cross validation process to ensure that the model avoids overfitting or underfitting. Supervised learning helps organizations solve for a variety of real-world problems at scale, such as classifying spam in a separate folder from your inbox. Some methods used in supervised learning include neural networks, naïve bayes, linear regression, logistic regression, random forest, support vector machine (SVM), and more.

Unsupervised learning, also known as unsupervised machine learning, uses machine learning algorithms to analyze and cluster unlabeled datasets. These algorithms discover hidden patterns or data groupings without the need for human intervention. Its ability to discover similarities and differences in information make it the ideal solution for exploratory data analysis, cross-selling strategies, customer segmentation, image and pattern recognition, etc. It is also used to reduce the number of features in a model through the process of dimensionality reduction; principal component analysis (PCA) and singular value decomposition (SVD) are two common approaches for this. Other algorithms used in unsupervised learning include neural networks, k-means clustering, probabilistic clustering methods, and more.

Semi-supervised machine learning offers a happy medium between supervised and unsupervised learning. During training, it uses a smaller labeled data set to guide classification and feature extraction from a larger, unlabeled data set. Semi-supervised learning can solve the problem of not having enough labeled data (or not being able to afford to label enough data) to train a supervised learning algorithm.

Reinforcement machine learning is a behavioral machine learning model that is similar to supervised learning, but the algorithm is not trained using sample data. This model learns as it goes by using trial and error. A sequence of successful outcomes will be reinforced to develop the best recommendation or policy for a given problem.

A few examples of machine learning commonly encountered include the following.

Speech recognition: It is also known as automatic speech recognition (ASR), computer speech recognition, or speech-to-text, and it is a capability which uses natural language processing (NLP) to process human speech into a written format. Many mobile devices incorporate speech recognition into their systems to conduct voice search or provide more accessibility around texting.

Customer service: Online chatbots are replacing human agents along the customer journey. They answer frequently asked questions (FAQs) around topics, like shipping, or provide personalized advice, cross-selling products or suggesting sizes for users and promoting customer engagement across websites and social media platforms. Examples include messaging bots on e-commerce sites with virtual agents, messaging apps, and tasks usually done by virtual assistants and voice assistants.

Computer vision: This AI technology enables computers and systems to derive meaningful information from digital images, videos and other visual inputs, and based on those inputs, it can take action. This ability to provide recommendations distinguishes it from image recognition tasks. Powered by convolutional neural networks, computer vision has applications within photo tagging in social media, radiology imaging in healthcare, and self-driving cars within the automotive industry.

Recommendation engines: Using past consumption behavior data, for example, AI algorithms can help to discover data trends that can be used to develop more effective cross-selling strategies. This is used to make relevant add-on recommendations to customers during the checkout process for online retailers.

As machine learning technology advances, it has certainly made our lives easier. However, implementing machine learning within businesses has also raised a number of ethical concerns surrounding AI technologies.

Privacy tends to be discussed in the context of data privacy, data protection and data security, and these concerns have allowed for strides in policy making. For example, in 2016, the General Data Protection Regulation or "GDPR" legislation was created to protect the personal data of people in the European Union and European Economic Area, giving individuals more control of their data. In the United States, individual states are developing policies, such as the California Consumer Privacy Act (CCPA), which require businesses to inform consumers about the collection of their data. This recent legislation has led companies to rethink how they store and use personally identifiable data.

FIG. 1 is a high-level hybrid block diagram and flow diagram of one example of operation of a system 100 incorporating one or more aspect of the present invention. Personal inputs 110 provide various data 120 regarding an individual, informed consent having been given by the individual on an opt-in basis. In one non-limiting example, the personal inputs may include a resume 125, curriculum vitae or other form providing an employment history including, for example, a length of each employment, locations of employment, performance reviews and any specialties, information regarding prior teams, such as size, type, etc., and any references, academic information, including, for example, college or other learning institutions attended, graduation date(s), degrees or certificates received, academic specialties, etc.

The personal inputs may also include, in one non-limiting example, messaging 130 of the individual, which can take various forms (e.g., texts, email, instant messages, etc.). Messaging may further include information such as general response time, response time based on organizational hierarchy, sentiment analytics, ratio of questions/answers (is the individual only asking questions or do they answer others' inquiries), context of messages (i.e., job related or not), time of instant message, do not disturb trend, etc. The personal inputs may also include, in another non-limiting example, video and/or images 135 of the individual (e.g., an interview) or including the individual and others (e.g., a conference), including, for example, information regarding eye contact, listening skills and body language/facial expression with speaking and in reacting to others' comments or statements, NPS (Net Promoter Scores), sentiment analytics, peer evaluation, fluctuations in communication styles, social technical eminence, publications, videos from speeches and conferences, calendar entry(ies) and punctuality.

In addition, the personal inputs may include, as another non-limiting example, other image and/or sound(s) (e.g., the individual interacting with one or more other individuals), which may come from various sources. For example, the personal inputs can include various IoT sensor feeds 140 (e.g., image, video, sound, etc.) as part of common items, like networked appliances. Further, the personal inputs may include feedback 145 in various forms, for example, an outcome of a work task in which the individual participated, for example, as part of a team of co-workers, as well as information such as under/over budget, early/on time/late outcome of task, reaction to changes in scope and deadline, goals achieved, etc. The feedback may also include, for example, an indicator of a level of satisfaction 160 of the individual from taking part in the work task or the satisfaction of one or more individuals that participated in the work task.

Thus, the various personal inputs are fed to one or more algorithm 165 to find the coefficients and/or variables 170 and their weight over time for affinities with other individuals 175, e.g., other employees. In one embodiment, the algorithm(s) include an ensemble learning model, which uses multiple algorithms to allow more flexibility in the personal inputs, and which is described in more detail below. These algorithms find the variables/coefficients and their appropriate weights in the algorithmic formula over time. This weighting of variables is what constitutes or creates the employee profiles which are then used to define an employee affinity indicator database.

In one non-limiting example use case, there may be a need to consider an employee for an existing team using information 185 about the existing team members. Using the information about existing team members and an affinity indicator (e.g., score) stored in a database 180, along with requirements 190 for a work project, a recommendation 192 of an employee for adding to the team can be provided to a user for optional consideration.

In another non-limiting example use case, choosing members of a potential work team 194 for a work project can be assisted by providing predicted affinities of each member of the potential team with each other member of the potential team, along with the requirements 196 for the work project and in one example, generating work affinity scores 198 for each pair of the potential team.

As new data becomes available about an individual, in one example, it automatically updates within the system so that the data is most current, such that the output remains up-to-date.

In statistics and machine learning, ensemble methods use multiple learning algorithms, versus just one, to obtain better predictive performance than could be obtained from any of the constituent learning algorithms alone. Unlike a statistical ensemble in statistical mechanics, which is usually infinite, a machine learning ensemble consists of a finite set of alternative models, but typically allows for a much more flexible structure to exist among those alternatives.

Stacking stands for "Stacked Generalization," which combines multiple individual models (or base models) with a final model (also known as meta-model or combiner-model) that is trained with the predictions of the base models. Stacking can be used for both classification and regression tasks with an option to use values or probabilities for classification tasks.

Stacking can be implemented with two or more than two layers: multi-layer stacking, where the base models are defined, aggregated with another layer of models, and then the final model. Even though this can produce better results, the cost of time due to complexity is a consideration.

In one embodiment, the affinity model takes the form of a stacking model and the ensemble learning includes receiving a set of training data. A plurality of instances of the set of training data may be fed to a plurality of base models. Each of the plurality of base models is run on a respective instance of the set of training data, resulting in a plurality of base model predictions. The stacking model is fed the base model predictions running the stacking model on the plurality of base model predictions, resulting and results in a work affinity indicator.

Bootstrap Aggregating or, in short, "Bagging" aggregates multiple estimators that use the same algorithm trained with different subsets of the training data. It can be used for both classification and regression tasks, using bootstrapping to create training data for each estimator with random sampling.

Bootstrapping is a method to create samples with replacement from the original data. It is done with replacement to give equal probability to each data point for being picked. Due to selection with replacement, some data points may be picked multiple times and some may never be picked. A probability of not being picked for a data point in a bootstrap sample with size n with the following formula (preferably n is a large number) can be calculated.

$$\left(1 - \frac{1}{n}\right)^n \simeq \frac{1}{e} \simeq 0.37$$

This means that each bagging estimator is trained using around 63% of the training dataset and the remaining 37% of the data set is known as an out-of-bag (00B) sample.

In summary, bagging draws n training datasets with replacement from the original training data for n estimators. Each estimator is trained on their sampled training dataset in parallel to make predictions. Then, bagging aggregates these predictions using techniques such as hard voting or soft voting.

Randomly sampled training datasets make the training less prone to deviations on the original data and, therefore, bagging reduces the variance of individual estimators.

A very popular bagging technique is referred to as "random forest" where the estimators are chosen as a decision tree. Random forest uses bootstrapping to create training datasets with replacement and may also select a set of features, without replacement.

In one embodiment, employee profiles may be stored in a database and updated as needed. Employees may then be matched to one another based on an indicator of their work affinity, which may take various forms, for example, an affinity score indicating a likelihood that two employees would work well together.

In one embodiment, using the work affinity indicator, top and bottom matches for work affinity for an individual to other existing and/or potential employees may be provided to a user for consideration via, for example, a user interface over a network, for example, over a global computer network. In addition to generating affinity scores, the system can predict future changes in interactions, i.e., when an affinity score will decrease or increase between two employees based on historical trends in their interactions.

Figure 3:
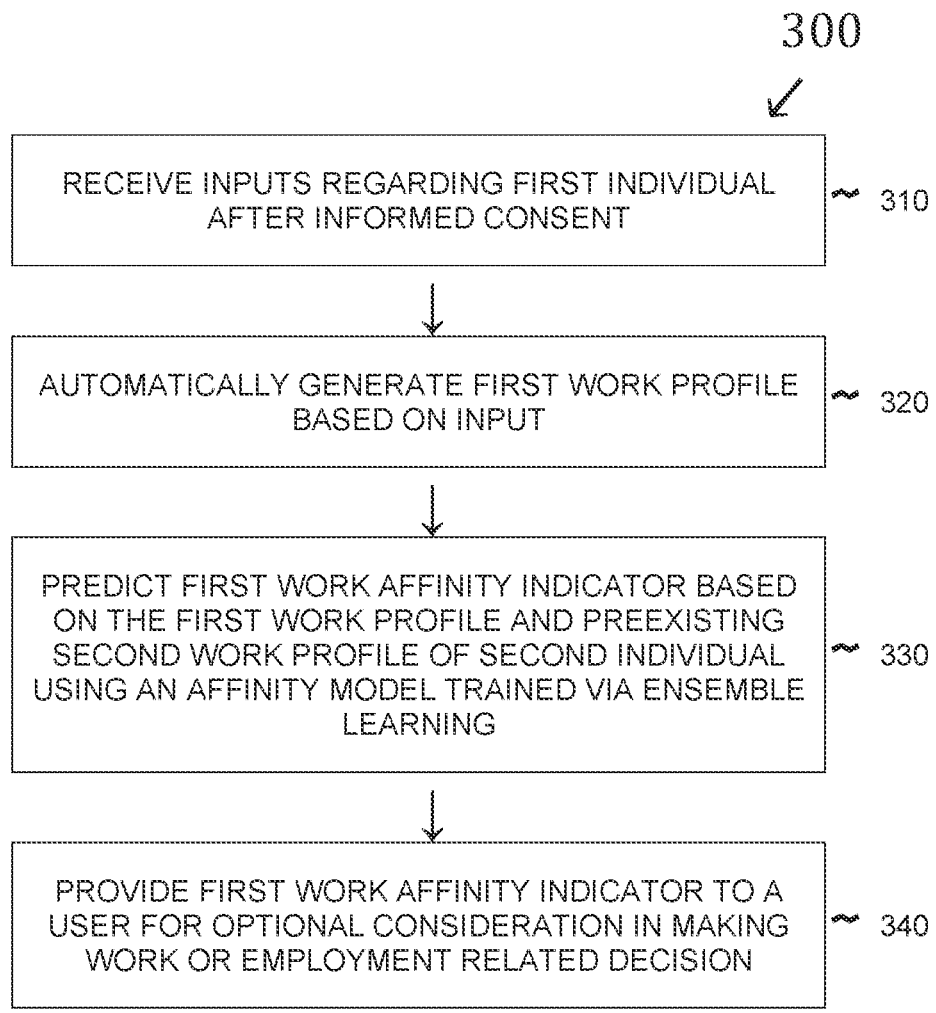
FIG. 3 is a flow diagram for one example of a method of predicting a work affinity between two individual, in accordance with one or more aspect of the present invention.

FIG. 3 is a flow diagram 300 for one example of a method of predicting a work affinity indicator between two individuals, for example, two existing employees or a prospective hire and an existing employee, in accordance with one or more aspect of the present invention. Personal inputs as defined herein are received 310 regarding a first individual after giving informed consent as defined herein. The personal inputs with regard to the first individual may include, for example, the types of personal inputs examples discussed above with respect to FIG. 1. Based on the personal inputs, a first work profile for the individual is automatically generated 320. Further details regarding automatically generating a work profile are provided subsequently with respect to FIG. 7. The method predicts 330 a first work affinity indicator, as defined herein, based on the first work profile and a preexisting second work profile of a second individual using an affinity model trained via ensemble learning.

In statistics and machine learning, ensemble methods use multiple learning algorithms, versus just one, to obtain better predictive performance than could be obtained from any of the constituent learning algorithms alone. Unlike a statistical ensemble in statistical mechanics, which is usually infinite, a machine learning ensemble consists of a finite set of alternative models, but typically allows for a much more flexible structure to exist among those alternatives.

Supervised learning algorithms perform the task of searching through a hypothesis space to find a suitable hypothesis that will make good predictions with a particular problem. Even if the hypothesis space contains hypotheses that are very well-suited for a particular problem, it may be very difficult to find a good one. Ensembles combine multiple hypotheses to form a (hopefully) better hypothesis. The term ensemble is usually reserved for methods that generate multiple hypotheses using the same base learner. The broader term of multiple classifier systems also covers hybridization of hypotheses that are not induced by the same base learner.

Evaluating the prediction of an ensemble typically requires more computation than evaluating the prediction of a single model. In one sense, ensemble learning may be thought of as a way to compensate for poor learning algorithms by performing a lot of extra computation. On the other hand, the alternative is to do a lot more learning on one non-ensemble system. An ensemble system may be more efficient at improving overall accuracy for the same increase in computer, storage, or communication resources by using that increase on two or more methods, than would have been improved by increasing resource use for a single method. Fast algorithms such as decision trees are commonly used in ensemble methods (for example, random forests), although slower algorithms can benefit from ensemble techniques as well.

By analogy, ensemble techniques have also been used in unsupervised learning scenarios, for example, in consensus clustering or in anomaly detection.

Returning to FIG. 3, the second individual is, for example, an existing employee of a business entity with an existing work profile, while the first individual may also be, for example, an existing employee or a potential employee. The first work affinity indicator may then be provided 340 to a user, for example, via a graphical user interface, for optional consideration in making a work or employment-related decision. In one example, a manager of a business entity may be considering the first individual for employment in a position working with the second individual, e.g., another employee or the manager. In a second example, the first individual may be an existing employee being considered to work in an existing team that includes the second individual.

In one example, the invention includes, for instance, a method of providing an indicator of affinity of one actual or prospective employee and another. The method includes, for example, receiving personal inputs regarding an individual after the individual has given informed consent to, for example, a prospective employer. The method can automatically generate a work profile for the individual based on the personal inputs. Based on the work profile of the individual and a preexisting work profile of another individual, the method can predict, using an affinity model trained via ensemble learning, a work affinity indicator (e.g., an affinity score) for the two individuals, which can provide an indication to the prospective employer, should the prospective employer choose to consider the work affinity indicator, of the likelihood the two individuals will work well together. In some manner, the work affinity indicator may be sent to the user (via, for example, a graphical user interface) for optional consideration in making a work-related or employment-related decision, for example, whether to hire the individual.

Figure 7:
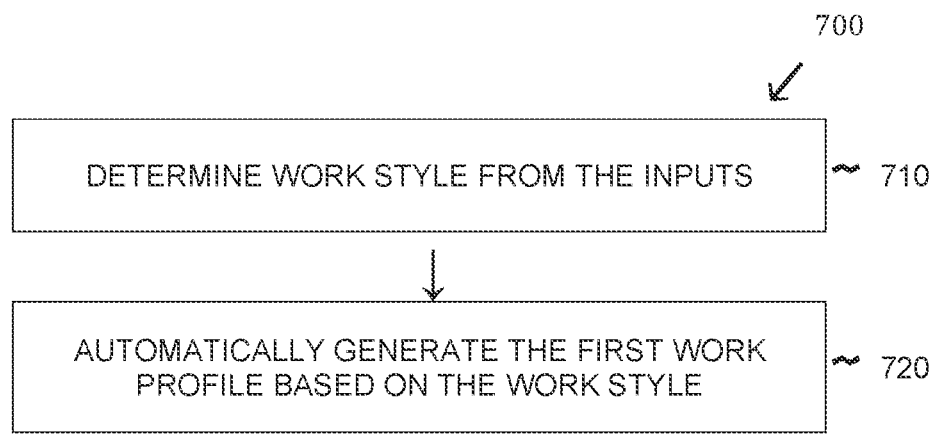
FIG. 7 is a flow diagram for one example of automatically generating a work profile for an individual, in accordance with one or more aspect of the present invention.

FIG. 7 is a flow diagram 700 for one example of automatically generating a work profile, as defined herein, for an individual, in accordance with one or more aspect of the present invention. Initially, a work style of the individual is determined 710 from the personal inputs defined herein and described above with respect to FIGS. 1 and 3. In one example, a work style may be based on the individual completing one or more assessments for evaluation. As non-limiting examples, a work style assessment may address issues such as personality in a workplace setting, personal preferences related to a work environment (e.g., communication preferences such as face-to-face, video conf., email, etc.) and schedule preferences. Returning to FIG. 7, the first work profile of the individual may then be automatically generated 720 based on the determined work style.

In one example, the personal inputs regarding the individual may include some form of feedback personal inputs subsequent to two individuals beginning to work together as a team, e.g., an indicator of an individual's satisfaction with an interaction with another employee or with respect to a task or task outcome.

In some cases, it may be desirable to assess how work affinity, for example, between two existing employees, may change over time, or in reaction to a change to the team. Thus, in one example, after the two individuals begin to work together as a team or part of the same team that includes other employee(s), the invention can predict a future change to the work affinity indicator based on a historical trend in interactions between the two individuals.

Figure 2:
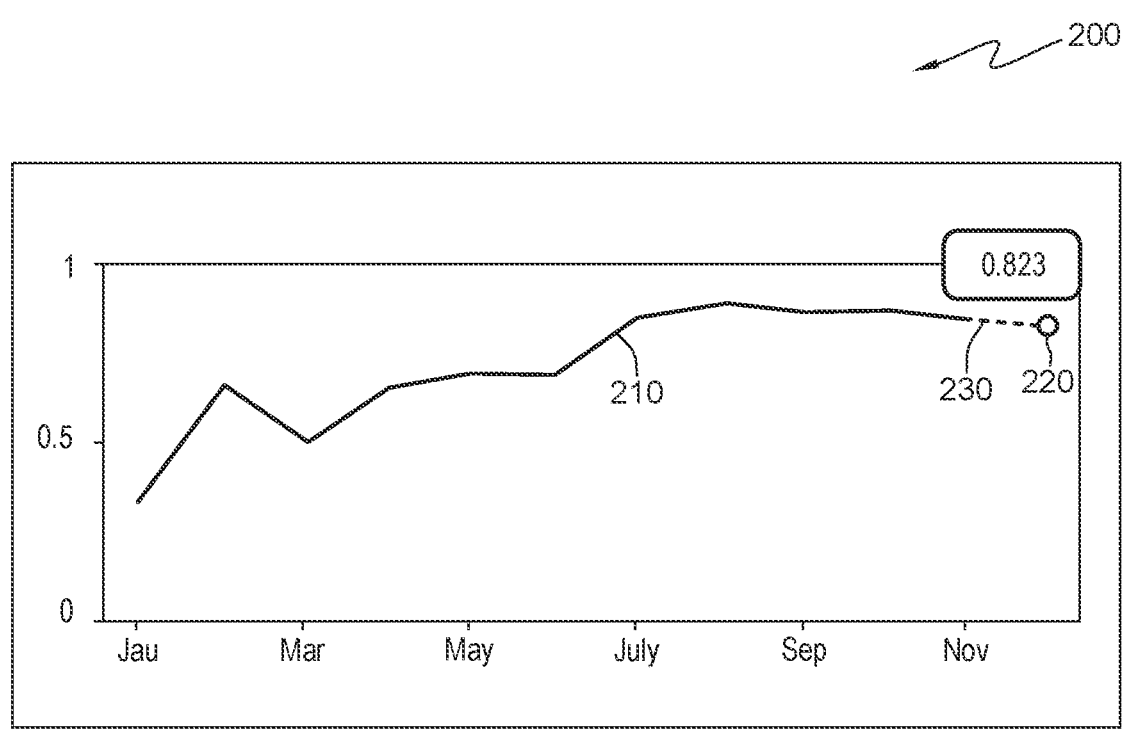
FIG. 2 depicts one example of a graph plotting work affinity indicators (e.g., work affinity scores) of two employees over time, in accordance with one or more aspect of the present invention.

FIG. 2 depicts one example of a graph 200 plotting work affinity indicators 210 (e.g., work affinity scores) of two employees over time. Using these historical work affinity scores, a future work affinity score 220 can be predicted 230.

Figure 8:
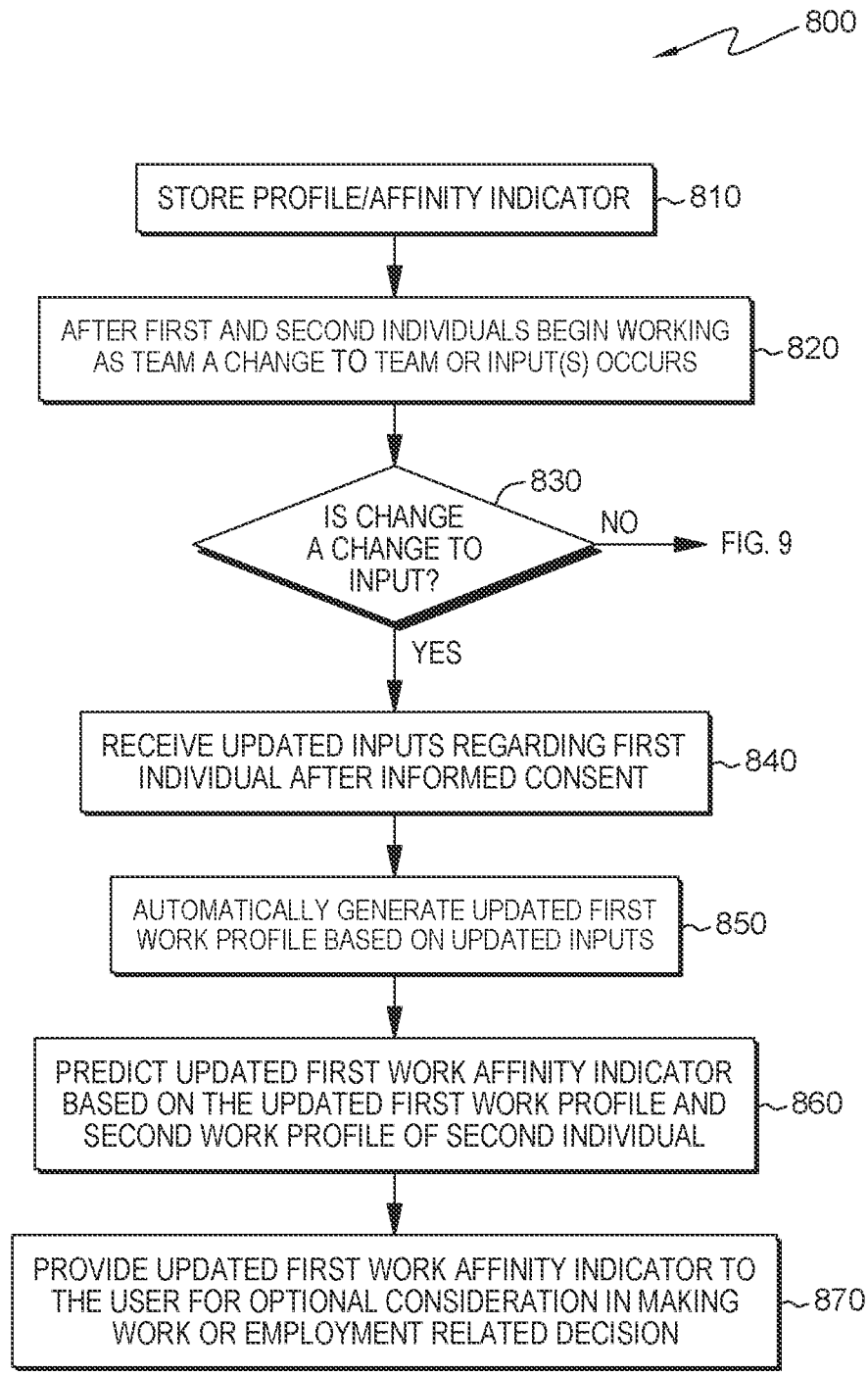
FIG. 8 is flow diagram for one of example of predicting how a work affinity may change, based on a change in input or a change in the team, in accordance with one or more aspect of the present invention.

FIG. 8 is flow diagram 800 for one of example of predicting how a work affinity may change, based on a change in personal inputs or a change to the team, such as, for example, a team member leaving the team (e.g., assigned to a different team or taking a new job with a different employer) in accordance with one or more aspect of the present invention. Consider, for example, a situation where such a change happens with the first and/or second individual described with regard to FIG. 3. The first work profile and the first work affinity indicator may initially be stored 810, for example, in a database. In one example, such a database could, in real time or periodically be updated with such information. Further, the affinity model may be run periodically using the updated data in the database. Returning to FIG. 8, after the first and second individuals begin working as a team, a change to the personal inputs or the team occurs 820. The change can be a change to the team, for example, the second individual leaving the team or, as another example, a change in the personal inputs used to generate the first work profile. For example, there may be more types of personal inputs and/or updated existing personal inputs (collectively, "updated personal inputs"). An inquiry 830 is made as to whether the change is a change in personal inputs. If so, then the updated personal inputs are received 840 regarding the first individual after providing an updated informed consent. An updated first work profile is automatically generated 850, based on the updated personal inputs. An updated first work affinity indicator may then be predicted 860, based on the updated first work profile and the second work profile of the second individual. The updated first work affinity indicator may then be provided 870 to the user for optional consideration in making or updating a work or employment related decision. If the change is not a change to the inputs, but a change to the team, a "no" to inquiry 830 in FIG. 8 is given, then the method proceeds to FIG. 9.

Figure 9:
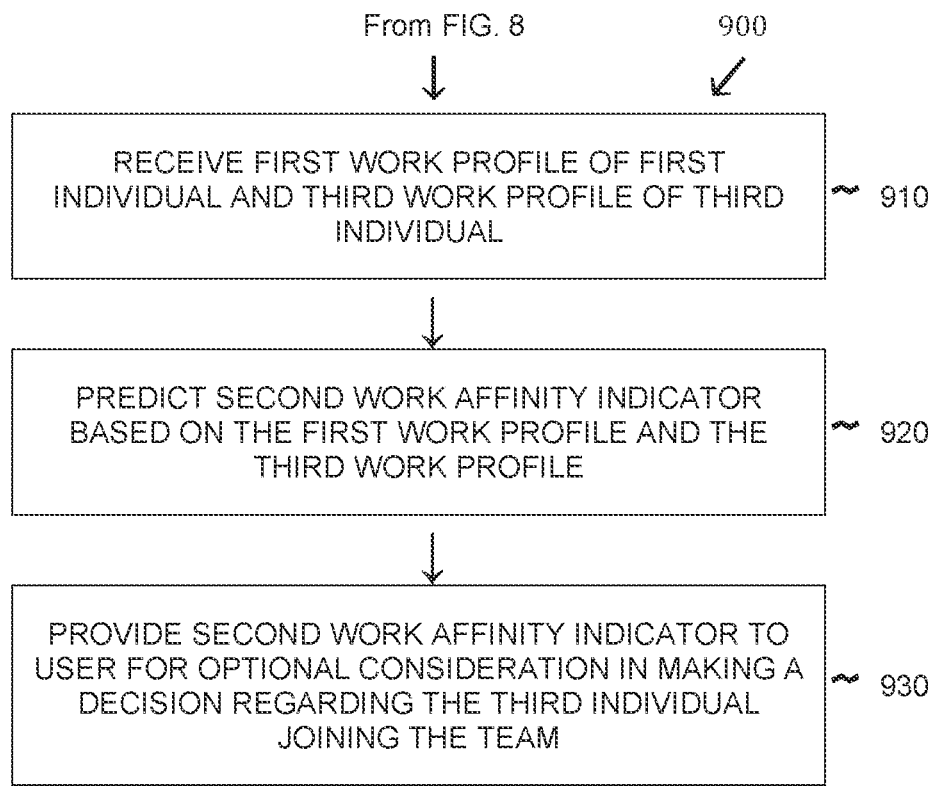
FIG. 9 is a flow diagram for one example of a change to the team taking place, in accordance with one or more aspect of the present invention.

FIG. 9 is a flow diagram 900 for one example of a change to the team taking place, in accordance with one or more aspect of the present invention. Consider the situation where, for example, the second individual leaves the team and a third individual (an existing employee, for example) is considered by the user for joining the team. As the third individual is an existing employee, a third work profile for the third individual exists in the system. If for some reason, there is no existing third work profile, one may then be created as previously discussed. In the case that the third work profile exists, the first work profile of the first individual and the third work profile of the third individual are received 910, for example, from a database storing such data. From the first work profile and the third work profile, a second work affinity indicator may be predicted 920, using the affinity model trained via ensemble learning. The predicted second work affinity indicator may then be provided 930 to the user (e.g., via a graphical user interface, such as a dashboard or the like) for optional consideration in making the decision regarding the third individual joining the team.

In another example, the method may be repeated between the first individual and a third individual (in addition to or instead of the second individual), resulting in a second work affinity indicator. This second work affinity indicator may also be provided to the user for optional consideration in making the work or employment related decision.

For example, if an employer (e.g., via manager) is considering the first individual to be added to an existing work team of the second and third individuals, the work affinity indicators (e.g., work affinity scores) may be helpful information in making that decision. Of course, the manager would be free to give any weight or no weight to the work affinity indicators.

In one example, the method may include, subsequent to the two individuals beginning to work together as a team, a change occurs to the team or the personal inputs. If the change is one to the personal inputs, updated personal inputs are received regarding the individual after giving their renewed informed consent. The personal inputs, in one example, could be updated inputs, such as, for example, an updated job history if the individual has had more or different job experiences or, for example, received additional education or certifications. From the updated personal inputs, the method automatically generates an updated work profile. Based on the updated work profile and the preexisting work profile of the other individual, the method can predict an updated work affinity indicator for the two individuals. The predicting uses the affinity model previously referenced that was trained using ensemble learning. The method may then provide the updated work affinity indicator to the user for optional consideration in making a work-related or employment-related decision, for example, whether the team should remain intact.

As another example, where the change is a change to the team (e.g., one of the team members has left the team, e.g., changed jobs), a replacement for the team member that left may be needed. In that situation, the employer may seek a replacement from existing employees. In such a case, the method receives the work profile of the remaining individual and a preexisting work profile of an existing employee. Form the work profiles, the method can predict a work affinity indicator. The work affinity indicator may then be sent to the user for optional consideration in making the decision regarding the existing employee joining the team.

Figure 10:
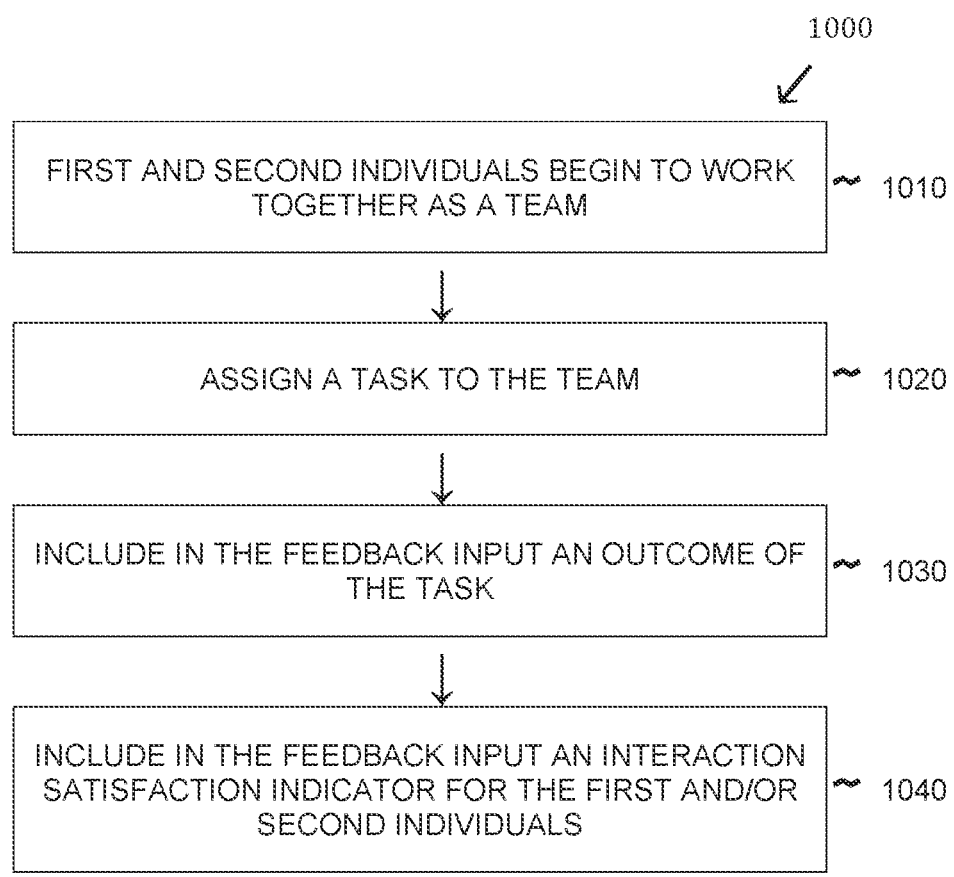
FIG. 10 is a flow diagram for one example of feedback input for automatically generating a first work profile for the first individual.

As discussed above with regard to FIG. 1, the personal inputs used to automatically generate the first work profile may include, for example, feedback personal input. FIG. 10 is a flow diagram 1000 for one example of feedback personal inputs for automatically generating a first work profile for the first individual. In one embodiment, subsequent to the first and second individuals beginning to work together as a team 1010, the team is assigned 1020 a task, e.g., by the user. In one example, the feedback personal inputs includes 1030 an outcome of the task. In one example, the task outcome may include a team self-assessment or a supervisor and/or customer assessment of the task outcome. In another example, the feedback personal inputs include an interaction satisfaction indicator for one or both of the first and second individuals. The interaction satisfaction indicator may relate to, for example, a satisfaction level of an overall performance of the team, a satisfaction level with the task as it relates to the team (e.g., whether the task underutilized the capabilities of the team) or a satisfaction level of the experience of one of the individuals working with the other individual.

The present invention is applicable to more than just a work affinity between two people. For example, a work affinity can be predicted for a first individual and each of multiple other individuals, e.g., a team of co-workers.

Figure 11:
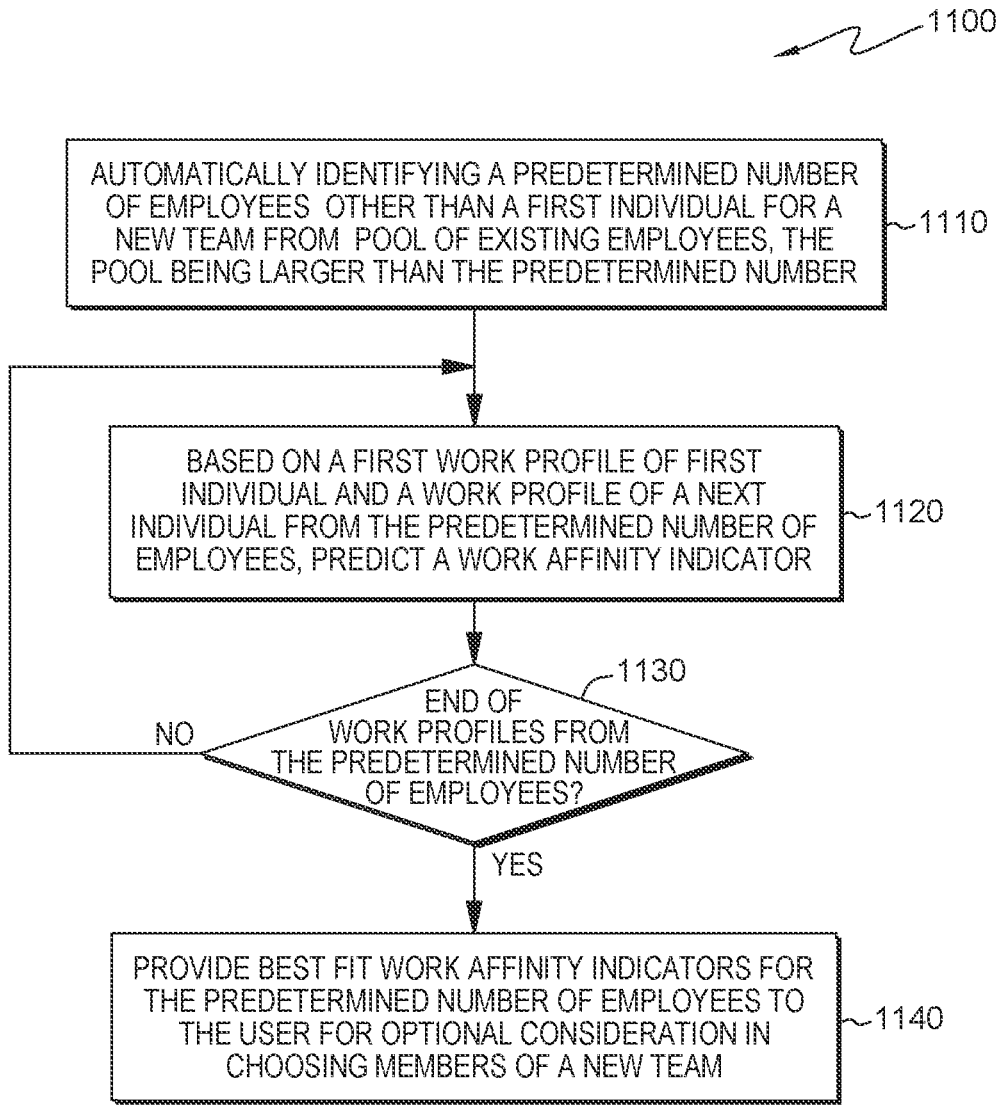
FIG. 11 is a flow diagram for one example of applying the invention to multiple people, in accordance with one or more aspect of the present invention.

FIG. 11 is a flow diagram 1100 for one example of applying the invention to multiple people, in accordance with one or more aspect of the present invention. In one example, the work-related or employment-related decision of the user may include forming a new team, including, for example, hiring an individual to lead the new team and two or more existing employees, such that at least three people are chosen for the new team. Initially, a predetermined number of existing employees are automatically identified 1110 (e.g., to be part of the new team), for example, based on predetermined criteria, from among a pool of current employees, the pool being larger than the predetermined number. In one example, the predetermined criteria could include, e.g., experience relevant to the purpose of the new team, such as launching a new product in a marketing capacity or designing the new product from an engineering standpoint. In the context of the new team being formed, the method can predict a work affinity indicator for the individual to head the new team and each of the other identified employees. Based on the first work profile and a next work profile of a next individual from the pool, predicting 1120 a next work affinity indicator. In the example, the method repeats the predicting for each successive employee from the pool until no further employees from the pool remain. More generally, an inquiry 1130 may be made as to whether the end of the work profiles for the predetermined number of employees has been reached. Based on there being more such work profiles remaining, a "no" to inquiry 1130, the predicting is then repeated for the next individual. Based on the end of the work profiles being reached, a "yes" to inquiry 1130, the method provides 1040 best-fit work affinity indicators for the predetermined number of other employees to the user for optional consideration in choosing members of the new team. From the work affinity indicators generated, the method can provide best-fit work affinity indicators for the predetermined number of existing employees and the head of the new team to the user for optional consideration in choosing members of the new team.

In one embodiment, the personal inputs visual cues data and verbal cues data, for example, from sensor(s) capturing the same, resulting in cues data, from an interaction between two individuals in an environment, e.g., a work environment. The cues data maybe, for example correlated using, for example, Pearson's correlation coefficient, discussed subsequently, in more detail. Using a classification algorithm, such as, for example, a K nearest neighbors (KNN) classification algorithm, the cues data may be classified, the case of KBB by storing the cues data, for example, in a decentralized cloud object storage. A machine learning model output from the KNN algorithm includes all the cues data and a prediction algorithm. The cues data may be provided to the KNN prediction algorithm to accomplish classification of the cues data. A K-means metadata clustering algorithm, for example, may be used to predict metadata cluster(s) and an average of data points in each metadata cluster, the outcome of which is one or more average data point. Based on the classified cues data and the one or more average data point, activity and characteristics of the first individual and the second individual may be mapped to variables of the environment, the result of which is an affinity association. The affinity association, in one example, may be fed to a reinforcement learning model, e.g., semi-supervised, as part of the ensemble learning.

K nearest neighbors (KNN) and other concepts in the above embodiment will now be addressed. Cross-validation is another way to retrospectively determine a good K value by using an independent dataset to validate the K value. Historically, the optimal K for most datasets has been between 3-10. That produces much better results than 1NN. A case is classified by a majority vote of its neighbors, with the case being assigned to the class most common amongst its K nearest neighbors measured by a distance function, for example, a Euclidean distance function. If K=1, then the case is simply assigned to the class of its nearest neighbor. Non-limiting examples of three common distance functions are given below.

$$\text{Euclidean } \sqrt{\sum_{i=1}^{k}(x_i - y_i)^2}$$

$$\text{Manhattan } \sum_{i=1}^{k}|x_i - y_i|$$

$$\text{Minkowski } (\sum_{i=1}^{k}(|x_i - y_i|^q)^{1/q}$$

It should also be noted that all three distance functions above are only valid for continuous variables. In the instance of categorical variables, the Hamming distance, shown below as part of one simple example, may be a better choice. It also brings up the issue of standardization of the numerical variables between 0 and 1 when there is a mixture of numerical and categorical variables in the dataset.

| Hamming Distance |
| --- |
| $$D_H = \sum_{i=1}^{k}|x_i - y_i|$$ |
| $x = y \Rightarrow D = 0$ |
| $x \neq y \Rightarrow D = 1$ |

| x | y | Distance |
| --- | --- | --- |
| Male | Male | 0 |
| Male | Female | 1 |

Choosing the optimal value for K is best done by first inspecting the data. In general, a large K value is more precise as it reduces the overall noise, but there is no guarantee. Cross-validation is another way to retrospectively determine a good K value by using an independent dataset to validate the K value. Historically, the optimal K for most datasets has been between 3-10. That produces much better results than 1NN.

The KNN algorithm's learning may take one of three forms: instance-based learning; lazy learning; and non-parametric learning.

Instance-based learning: Here, weights are not learned from training data to predict output (as in model-based algorithms) but use entire training instances to predict output for unseen data.

Lazy Learning: In this case, the model is not learned using training data prior and the learning process is postponed to a time when prediction is requested on a new instance.

Non-Parametric: In KNN, there is no predefined form of the mapping function.

One example of data preparation for the KNN algorithm includes, for example: data scaling; dimensionality reduction and missing value treatment.

Data Scaling: To locate a data point in multidimensional feature space, it would be helpful if all features are on a same scale. Hence, normalization or standardization of data is encouraged.

Dimensionality Reduction: KNN may not work as well if there are too many features. Hence, dimensionality reduction techniques like, for example, feature selection or principal component analysis may be implemented.

Missing value treatment: If out of M features, one feature data is missing for a particular example in the training set then locating or calculating distance from that point will not be possible. Therefore, deleting that row or imputation may be necessary.

In one example, pseudocode for implementing the KNN algorithm may include: loading the training data; preparing the data by scaling, missing value treatment and dimensionality reduction, as needed; and finding an optimal value for K by predicting a class value for new data, which may include the following: calculating a distance (X, Xi) from i=1, 2, 3, . . . , n, where X=a new data point. Xi=training data and distance as per the chosen distance metric; then sorting these distances in increasing order with corresponding training data. From this sorted list the top 'K' rows are selected. Finding the most frequent class from these chosen 'K' rows is done, the result is a predicted class.

In one embodiment, the training model may be based on verbal/visual cues of an individual from sensor feed(s) of one or more common household items (e.g., a refrigerator) networked as part of the Internet of Things ("IoT").

A speaker recognition model working with Recurrent Neural Networks (RNN) involves Mel Frequency Cepstral Coefficients (MFCC) speech features extraction working in conjunction with Student-T Mixture model for speaker identification and analysis of speaker data at different points in time.

A Fast R-CNN network takes as input an entire image and a set of object proposals. The network first processes the whole image with several convolutional (cony) and max pooling layers to produce a cony feature map. Then, for each object proposal a region of interest (RoI) pooling layer extracts a fixed-length feature vector from the feature map. Each feature vector is fed into a sequence of fully connected (fc) layers that finally branch into two sibling output layers: one that produces softmax probability estimates over K object classes plus a catch-all "background" class and another layer that outputs four real-valued numbers for each of the K object classes. Each set of 4 values encodes refined bounding-box positions for one of the K classes.

In sound processing, the mel-frequency cepstrum (MFC) is a representation of the short-term power spectrum of a sound, based on a linear cosine transform of a log power spectrum on a nonlinear mel scale of frequency.

Mel-frequency cepstral coefficients (MFCCs) are coefficients that collectively make up an MFC. They are derived from a type of cepstral representation of the audio clip (a nonlinear "spectrum-of-a-spectrum"). The difference between the cepstrum and the mel-frequency cepstrum is that in the MFC, the frequency bands are equally spaced on the mel scale, which approximates the human auditory system's response more closely than the linearly-spaced frequency bands used in the normal spectrum. This frequency warping can allow for better representation of sound, for example, in audio compression.

MFCCs are commonly derived as follows: taking the Fourier transform of (a windowed excerpt of) a signal; mapping the powers of the spectrum obtained above onto the mel scale, using triangular overlapping windows or alternatively, cosine overlapping windows; taking the logs of the powers at each of the mel frequencies; taking the discrete cosine transform of the list of mel log powers, as if it were a signal; and the resulting MFCCs are the amplitudes of the resulting spectrum.

There can be variations on this process, for example: differences in the shape or spacing of the windows used to map the scale, or addition of dynamics features such as "delta" and "delta-delta" (first- and second-order frame-to-frame difference) coefficients.

In probability and statistics, Student's t-distribution (or simply the t-distribution) is any member of a family of continuous probability distributions that arise when estimating the mean of a normally distributed population in situations where the sample size is small and the population's standard deviation is unknown. It was developed by English statistician William Sealy Gosset under the pseudonym "Student."

The t-distribution plays a role in a number of widely used statistical analyses, including Student's t-test for assessing the statistical significance of the difference between two sample means, the construction of confidence intervals for the difference between two population means, and in linear regression analysis. Student's t-distribution also arises in the Bayesian analysis of data from a normal family.

If we take a sample of n observations from a normal distribution, then the t-distribution with v=n−1 degrees of freedom can be defined as the distribution of the location of the sample mean relative to the true mean, divided by the sample standard deviation, after multiplying by the standardizing term $\sqrt{n}$. In this way, the t-distribution can be used to construct a confidence interval for the true mean.

The t-distribution is symmetric and bell-shaped, like the normal distribution. However, the t-distribution has heavier tails, meaning that it is more prone to producing values that fall far from its mean. This makes it useful for understanding the statistical behavior of certain types of ratios of random quantities, in which variation in the denominator is amplified and may produce outlying values when the denominator of the ratio falls close to zero. The Student's t-distribution is a special case of the generalized hyperbolic distribution.

The Connectionist Temporal Classification (CTC) system consists of an acoustic model trained with CTC loss with context-dependent phoneme outputs, a n-gram language model and pronunciation dictionaries. A phoneme is the smallest phonetic unit in a language capable of conveying a distinction in meaning.

Connectionist temporal classification (CTC) is a type of neural network output and associated scoring function, for training recurrent neural networks (RNNs), for example, LSTM (Long Short-Term Memory) networks to tackle sequence problems where the timing is variable. It can be used for tasks like on-line handwriting recognition or recognizing phonemes in speech audio. CTC refers to the outputs and scoring, and is independent of the underlying neural network structure.

The input is a sequence of observations, and the outputs are a sequence of labels, which can include blank outputs. The difficulty of training comes from there being many more observations than there are labels. For example, in speech audio there can be multiple time slices which correspond to a single phoneme. Since the alignment of the observed sequence with the target labels is not known, a probability distribution at each time step can be predicted. A CTC network has a continuous output (e.g., softmax), which is fitted through training to model the probability of a label. CTC does not attempt to learn boundaries and timings: Label sequences are considered equivalent if they differ only in alignment, ignoring blanks. Equivalent label sequences can occur in many ways—which makes scoring a non-trivial task, but there is, for example, an efficient forward—backward algorithm for that.

CTC scores can then be used with the back-propagation algorithm to update the neural network weights. One example of an alternative to a CTC-fitted neural network is a hidden Markov model.

An n-gram model is a type of probabilistic language model for predicting the next item in such a sequence in the form of a (n−1)—order Markov model. N-gram models are now widely used in probability, communication theory, computational linguistics (for instance, statistical natural language processing), computational biology (for instance, biological sequence analysis) and data compression. Two benefits of n-gram models (and algorithms that use them) are simplicity and scalability—with larger n, a model can store more context with a well-understood space—time tradeoff, enabling small experiments to scale up efficiently.

In the fields of computational linguistics and probability, an n-gram (sometimes also called Q-gram) is a contiguous sequence of n items from a given sample of text or speech. The items can be phonemes, syllables, letters, words or base pairs according to the application. The n-grams typically are collected from a text or speech corpus. When the items are words, n-grams may also be called "shingles."

Using Latin numerical prefixes, an n-gram of size 1 is referred to as a "unigram"; size 2 is a "bigram" (or, less commonly, a "digram"); and size 3 is a "trigram." English cardinal numbers are sometimes used, e.g., "four-gram," "five-gram," and so on. In computational biology, a polymer or oligomer of a known size is called a k-mer instead of an n-gram, with specific names using Greek numerical prefixes such as "monomer," "dimer," "trimer," "tetramer," "pentamer," etc., or English cardinal numbers, "one-mer," "two-mer," "three-mer," etc.

Over the training period, the training set is expansive enough to use the RNN network in order to predict the user's affinity level based on previous interaction history and fetching the records from the COS (cloud Object Storage) and document it for a user in the database.

User's habits and variations in the behavior or anomalies may be captured from, for example, wearable sensors and/or IoT sensors which are also storing the data in a decentralized Cloud Object Storage (COS) where a Fast R-CNN (Region-Based Convolution Neural Network) algorithm running in the backend in order to detect the user's activity and correlate with the other user's metadata.

Affinity scoring for user U based on visual and aural cues recording: affinity scoring is performed by ingesting the output of the visual cues data and verbal cues data which is stored and documented in real-time in the COS for a given user based on his/her interactions with other users. As part of the affinity scoring determination, a Pearson correlation coefficient, for example, may be used to establish the correlation of two user's choices/preferences −X with respect context and create an association for affinity. In statistics, the Pearson correlation coefficient (PCC)— also known as "Pearson's r," the Pearson product-moment correlation coefficient (PPMCC), the bivariate correlation, or colloquially simply as the correlation coefficient—is a measure of linear correlation between two sets of data. It is the ratio between the covariance of two variables and the product of their standard deviations; thus, it is essentially a normalized measurement of the covariance, such that the result always has a value between negative one and positive one. As with covariance itself, the measure can only reflect a linear correlation of variables, and ignores many other types of relationship or correlation. As a simple example, one would expect the age and height of a sample of teenagers from a high school to have a Pearson correlation coefficient significantly greater than zero, but less than positive one (as positive one would represent an unrealistically perfect correlation).

KNN classification/K-means clustering algorithms and creation of the submodels (logistic regression, decision tree classifier (Pearson's correlation equation, shown below)) may be used, which are then fed into the semi-supervised reinforcement learning module as a part of the ensemble learning method. The final result is an average affinity indicator (e.g., score) for associating an individual with another individual based on the recommendation model.

Pearson's correlation coefficient formula is given below:

$$r_{XY} = \frac{\sum_{i=1}^{n}(X_i - \bar{X})(Y_i - \bar{Y})}{\sqrt{\sum_{i=1}^{n}(X_i - \bar{X})^2}\sqrt{\sum_{i=1}^{n}(Y_i - \bar{Y})^2}}$$

In the formula above, the variables are described as:
"$r_{XY}$" is the Pearson's Correlation Coefficient;
"$X_i$" is the values of the "X" variable;
"$\bar{X}$" is the mean of the values of the "X" variable;
"$Y_i$" is the value of the "Y" in a sample;
"$\bar{Y}$" is the mean of the values of the "Y" variable; and
"n" is the number of data "pairs".

Using KNN Classification and K-Means Clustering algorithms, specific activity and metadata characteristics can be mapped and then applied to specific environment variables contained within the given context.

The KNN algorithm's learning may take, for example, one of three forms: instance-based learning; lazy learning; and non-paramatric learning.

With instance-based learning, weights are not learned from training data to predict output (as in model-based algorithms) but use entire training instances to predict output for unseen data.

Regarding lazy learning, the model is not learned using training data prior and the learning process is postponed to a time when prediction is requested on a new instance.

For non-parametric KNN, there is no predefined form of the mapping function.

One example of data preparation for the KNN algorithm includes, for example, data scaling; dimensionality reduction and missing value treatment.

To locate a data point in multidimensional feature space, it would be helpful if all features are on a same scale. Hence, normalization or standardization of data (generally, data scaling) may be helpful.

KNN may not work as well if there are too many features. Hence, dimensionality reduction techniques like, for example, feature selection or principal component analysis may be implemented.

If out of M features, one feature data is missing for a particular example in the training set, then locating or calculating distance from that point will not be possible. Therefore, deleting that row or imputation may be necessary, i.e., the missing value treatment.

In one example, implementing the KNN algorithm may include: loading the training data; preparing the data by scaling, missing value treatment, and dimensionality reduction, as needed; finding an optimal value for K by predicting a class value for new data, which may include calculating a distance (X, Xi) from i=1,2,3, . . . , n, where X=a new data point, Xi=training data and distance as per the chosen distance metric. Sorting these distances in increasing order with corresponding training data. From this sorted list, select the top 'K' rows. Finding the most frequent class from these chosen 'K' rows is done, resulting in a predicted class.

In the form of feedback, the output of the decision tree/random forest classifier may be fed into the semi-supervised reinforcement learning module as part of our ensemble learning approach in order to continuously/predict the next reward function, i.e., satisfaction level of the user based on state parameters, and the context risk scoring.

A normalized feature scaling matrix is used for multiple users working in a same environment simultaneously in order to generate the optimal normalized predicted output considering above state parameters, environment variables, and a normalized reward function to create a recommendation.

The pseudocode below is a example in Python of using KNN classification/K-means clustering algorithms and creation of the submodels (logistic regression, decision tree classifier (Pearson's correlation coefficient formula)) which are then fed into the semi-supervised reinforcement learning module as a part of the ensemble learning method. The final results is the average rating (e.g., score) for associating a user with another user based on the recommendation model.

```
import pandas
from sklearn import model_selection
from sklearn.ensemble import VotingClassifier
url = "data.csv"
names = ['U1', 'U2', 'U3', U4']
names.append ['U5']
dataframe = pandas.read_csv(url, names=names)
array = dataframe.values
X = array[:,0:5]
Y = array[:,5]
seed = 7
kfold = model_selection.KFold(n_splits=10, random_state=seed)
# create the sub models
estimators = [ ]
model1 = logistic_regression(TF_IDF( )) - Assesses user cognitive
trajectory
(Document storing every user's U1-U4 attributes in COS)
estimators.append(('logistic', model1))
model2 = DecisionTreeClassifier(Pearson_Correlation) - user's correla-
tion with U5 to check for risk with associating said user
if (reward_f >1)
estimators. Append(('U5', model2))
# create the ensemble model
ensemble = VotingClassifier(estimators)
results = model_selection.cross_val_score(ensemble, X, Y, cv=kfold)
print(results.mean( )) #Avg score rating for associating said user based
on recommended model
```

The pseudocode below describes an example of potential personal inputs data from an individual user (e.g., User U5) that is gathered from performing processes such as sentiment analysis and as text correlation. One example of a commercially available AI to assist is IBM® Watson Personality Insights.

```
trait_id": "big5_openness",
"name": "Openness",
"category": "personality",
"percentile": 0.8011555009553,
"raw_score": 0.77565404255038,
"significant": true,
"children": [
{
"trait_id": "facet_adventurousness",
"name": "Adventurousness",
"category": "personality",
"percentile": 0.89755869047319,
"raw_score": 0.54990704031219,
"significant": true
} ] },
{
"trait_id": "big5_conscientiousness",
"name": "Conscientiousness",
"category": "personality",
"percentile": 0.81001753184176,
"raw_score": 0.66899984888815,
"significant": true,
"children": [
{
"trait_id": "facet_achievement_striving",
"name": "Achievement striving",
"category": "personality",
"percentile": 0.84613299226628,
"raw_score": 0.74240118454888,
"significant": true
```

Certain embodiments herein may offer various technical computing advantages involving computing advantages to address problems arising in the realm of computer networks. Particularly, computer networks operating to provide an indicator of work affinity between individuals for optional consideration in making a work-related or employment-related decision. A fundamental aspect of operation of a computer system is its interoperation to which it operates including human actors. By increasing the accuracy and reliability of information presented to human users, embodiments herein increase the level of engagement of human users for enhanced computer system operation. Embodiments herein can include predicting a work affinity between two individuals, for example, one a candidate for employment and the other an existing employee, from personal inputs of data regarding the candidate after having given informed consent for the data to be used in assessing the candidate for employment. Embodiments herein can determine a work style and word conduct trait(s) from the personal inputs and automatically generate a work profile for the candidate from the determined work style. Embodiments herein may use feedback as part of the personal inputs, for example, feedback on a sample task or an interaction (e.g., with the existing employee) satisfaction indicator. Embodiments herein can predict a future change to the work affinity based on a historical trend of interactions, which assumes the candidate was hired and has been working with the existing employee as a team for a time. Embodiments herein can predict an updated work affinity indicator when a change to the personal inputs or a change in the team occurs. Embodiments herein can provide best-fit work affinity indicators to build a new team from the candidate (now employee) and each other employee being considered for the team.

Various decision data structures can be used to drive artificial intelligence (AI) decision making, such as decision data structure that predicts work affinity between an employee(s) or an employee candidate(s) using an affinity model trained using ensemble learning. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

In a first aspect, disclosed above is a computer-implemented method. The computer-implemented method includes: receiving personal inputs regarding a first individual after informed consent is given by the first individual; automatically generating a first work profile for the first individual based on the personal inputs; based on the first work profile of the first individual and a preexisting second work profile of a second individual, predicting a first work affinity indicator for the first individual and the second individual, the predicting including using an affinity model trained via ensemble learning; and providing the first work affinity indicator to a user for optional consideration in making a work-related or employment-related decision.

In one example, the automatically generating in the computer-implemented method of the first aspect may include, for example: determining a work style from the personal inputs; and automatically generating the first work profile based on the work style.

In one example, the plurality of personal inputs include, for example, feedback inputs and subsequent to the first individual and the second individual beginning to work together as a team, the method further includes, for example, assigning a task to the team. The feedback personal inputs including an outcome of the task and interaction satisfaction indicator(s) for one or more of the first individual and the second individual.

In one example, the computer-implemented method of the first aspect may further include, for example, subsequent to the first individual and the second individual beginning to work together as a team, predicting a future change in the first work affinity indicator based on a historical trend in interactions between the first individual and the second individual.

In one example, the computer-implemented method of the first aspect may further include, for example: subsequent to the first individual and the second individual beginning to work together as a team, a change occurring to at least one of the team and the at least one of the personal inputs; based on the change being a change to the personal inputs, receiving updated personal inputs regarding the first individual after renewed informed consent is given by the first individual; automatically generating an updated first work profile based on the updated personal inputs; based on the updated first work profile and the preexisting second work profile of the second individual, predicting an updated first work affinity indicator for the first individual and the second individual, the predicting using, for example, the affinity model trained via ensemble learning; and providing the updated first work affinity indicator to the user for optional consideration in making an updated work-related or employment-related decision.

In one example, the computer-implemented method of the first aspect may further include, for example: based on the change being a team change, receiving the first work profile of the first individual and a preexisting third work profile of a third individual; predicting a second work affinity indicator based on the first work profile and the preexisting third work profile; and providing the second work affinity indicator to the user for optional consideration in making a decision regarding the third individual joining the team.

In one example, the work-related or employment-related decision in the method of first aspect may include, for example, hiring the first individual for a new team and automatically identifying a predetermined number of other employees for the new team from among a pool of existing employees, the pool being larger than the predetermined number. The method further includes, for example, based on the first work profile of the first individual and a work profile of a next employee from the predetermined number of other employees, predicting a next work affinity indicator for the first individual and the next employee; repeating the predicting for each successive employee from the predetermined number of other employees until no further employees remain; and providing best-fit work affinity indicators for the predetermined number of other employees to the user for optional consideration in choosing members of the new team.

In one example, the computer-implemented method of the first aspect may include, for example: the personal inputs may include a plurality of visual and verbal cues data, resulting in cues data, from an interaction between the first individual and the second individual in an environment. The method further includes, for example, correlating the cues data of the first individual and the second individual using Pearson's correlation coefficient; using a K nearest neighbors (KNN) classification algorithm, storing the cues data in a decentralized cloud object storage, providing the cues data to a KNN prediction algorithm and predicting, by the KNN prediction algorithm, one or more classification of the cues data. The method further includes, for example, using a K-means metadata clustering algorithm, predicting, by the K-means metadata clustering algorithm, one or more metadata cluster and an average of data points in each of the one or more metadata cluster, resulting in one or more average data point. The method further includes, for example, based on the one or more classification of the cues data and the one or more average data point, mapping activity and characteristics of the first individual and the second individual to a plurality of variables of the environment, resulting in an affinity association. Further, the method includes, for example, providing the affinity association to a semi-supervised reinforcement learning model as part of the ensemble learning.

In one example, the computer-implemented method of the first aspect may include, for example, the affinity model as a stacking model. The ensemble learning may include, for example: receiving a set of training data; providing a plurality of instances of the set of training data to a plurality of base models; running each of the plurality of base models on a respective instance of the plurality of instances, resulting in a plurality of base model predictions; and running the stacking model on the plurality of base model predictions, resulting in the first work affinity indicator.

In one example, the computer-implemented method of the first aspect may include, for example: subsequent to the first individual and the second individual beginning to work together as a team, a change occurring that results in a change to the first work affinity indicator; based on the change being a future change, predicting the future change to the first work affinity indicator based on a historical trend in interactions between the first individual and the second individual. The method further includes, for example, based on the change being a change to the personal inputs, receiving an updated plurality of personal inputs regarding the first individual after renewed informed consent is given by the first individual. The method also includes, for example, automatically generating an updated first work profile for the change to the personal inputs based on the updated plurality of personal inputs; based on the updated first work profile and a preexisting work profile of the second individual for the change to the personal inputs, predicting an updated first work affinity indicator for the first individual and the second individual, wherein the predicting uses the affinity model trained via ensemble learning. The method also includes, for example, providing the updated first work affinity indicator to the user for optional consideration in making an updated work-related or employment-related decision; based on the change being a team change, receiving the first work profile of the first individual and a preexisting third work profile of a third individual previously having given informed consent. The method further includes, for example, predicting a second work affinity indicator based on the first work profile and the preexisting third work profile; and providing the second work affinity indicator to the user for optional consideration in making a decision regarding the third individual joining the team.

In one example, the computer-implemented method of the first aspect may include, for example, the work-related or employment-related decision may include hiring at least three individuals for a new team and the automatically generating may include determining a work style for the first individual from the plurality of personal inputs and automatically generating the first work profile based on the work style. The method further includes, for example, automatically identifying a predetermined number of other employees for the new team from among a pool of existing employees, the pool being larger than the predetermined number. Based on the first work profile of the first individual and a work profile of a first employee from the predetermined number of other employees, predicting a first work affinity indicator for the first individual and the first employee, wherein the affinity model may include a stacking model. The ensemble learning may include: receiving a set of training data; providing a plurality of instances of the set of training data to a plurality of base models; running each of the plurality of base models on a respective instance of the plurality of instances, resulting in a plurality of base model predictions; receiving, by the stacking model, the plurality of base model predictions; running the stacking model on the plurality of base model predictions, resulting in the first work affinity indicator. The method may further include, for example, based on the first work profile of the first individual and a work profile of a next employee from the predetermined number of other employees, predicting a next work affinity indicator for the first individual and the next employee; repeating the predicting for each successive employee from the predetermined number of other employees until no further employees remain; and providing best-fit work affinity indicators for the predetermined number of other employees to the user for optional consideration in the hiring for the new team.

In a second aspect, disclosed above is a system including a memory; processor(s) in communication with the memory; and program instructions stored in the memory and executable by the processor(s) via the memory to perform a method. The method includes: receiving personal inputs regarding a first individual after informed consent is given by the first individual; automatically generating a first work profile for the first individual based on the personal inputs; based on the first work profile of the first individual and a preexisting second work profile of a second individual, predicting a first work affinity indicator for the first individual and the second individual, the predicting including using an affinity model trained via ensemble learning; and providing the first work affinity indicator to a user for optional consideration in making a work-related or employment-related decision.

In one example, the automatically generating in the method of the system of the second aspect may include, for example: determining a work style from the personal inputs; and automatically generating the first work profile based on the work style.

In one example, the personal inputs may include feedback personal inputs in the method of the system of the second aspect, and subsequent to the first individual and the second individual working together as a team, assigning a task to the team, the feedback personal inputs including an outcome of the task and interaction satisfaction indicator(s) for the first individual and/or the second individual.

In one example, the method of the system of the second aspect may further include, for example, subsequent to the first individual and the second individual beginning to work together as a team, predicting a future change in the first work affinity indicator based on a historical trend in interactions between the first individual and the second individual.

In one example, the method of the system of the second aspect may further include, for example: subsequent to the first individual and the second individual beginning to work together as a team, a change occurring to at least one of the team and the at least one of the personal inputs; based on the change being a personal inputs change, receiving updated personal inputs regarding the first individual after renewed informed consent is given by the first individual; automatically generating an updated first work profile based on the updated personal inputs; based on the updated first work profile and the preexisting second work profile of the second individual, predicting an updated first work affinity indicator for the first individual and the second individual, wherein the predicting uses the affinity model trained via ensemble learning; and providing the updated first work affinity indicator to the user for optional consideration in making a work-related or employment-related decision.

In one example, the method of the system of the second aspect may further include, for example: based on the change being a team change, receiving the first work profile of the first individual and a preexisting third work profile of a third individual; predicting a second work affinity indicator based on the first work profile and the preexisting third work profile; and providing the second work affinity indicator to the user for optional consideration in making a work-related or employment-related decision.

In one example, the method of the system of the second aspect may further include, for example: hiring the first individual for a new team and automatically identifying a predetermined number of other employees for the new team from among a pool of existing employees, the pool being larger than the predetermined number. The method further includes, for example, based on the first work profile of the first individual and a work profile of a next employee from the predetermined number of other employees, predicting a work affinity indicator for the first individual and the next employee; repeating the predicting for each successive employee from the predetermined number of other employees until no further employees remain; and providing best-fit work affinity indicators for the predetermined number of other employees to the user for optional consideration in choosing members of the new team.

In a third aspect, disclosed above is a computer program product including a computer readable storage medium readable by processing circuit(s) and storing instructions for execution by the processing circuit(s) for performing a method. The method includes, for example: receiving personal inputs regarding a first individual after informed consent is given by the first individual; automatically generating a first work profile for the first individual based on the personal inputs; based on the first work profile of the first individual and a preexisting second work profile of a second individual, predicting a first work affinity indicator for the first individual and the second individual, the predicting including using an affinity model trained via ensemble learning; and providing the first work affinity indicator to a user for optional consideration in making a work-related or employment-related decision.

In one example, the automatically generating in the method of the third aspect may include, for example: determining a work style from the personal inputs; and automatically generating the first work profile based on the work style.

In one example, the method of the third aspect may include feedback personal inputs and subsequent to the first individual and the second individual beginning to work together as a team, the method may further include, for example, assigning a task to the team, the feedback personal inputs including an outcome of the task and interaction satisfaction indicator(s) for the first individual and/or the second individual.

In one example, the method of the third aspect may further include, for example, subsequent to the first individual and the second individual beginning to work together as a team, predicting a future change in the first work affinity indicator based on a historical trend in interactions between the first individual and the second individual.

In one example, the method of the third aspect may further include, for example: subsequent to the first individual and the second individual beginning to work together as a team, a change occurs to the team and/or the personal inputs; based on the change being a personal inputs change, receiving an updated plurality of personal inputs regarding the first individual after renewed informed consent is given by the first individual; automatically generating an updated first work profile based on the updated plurality of personal inputs; based on the updated first work profile and a preexisting work profile of the second individual, predicting an updated first work affinity indicator for the first individual and the second individual, the predicting using the affinity model trained via ensemble learning; providing the updated first work affinity indicator to the user for optional consideration in making an updated work-related or employment-related decision; based on the change being a team change, receiving the first work profile of the first individual and a preexisting third work profile of a third individual; predicting a second work affinity indicator based on the first work profile and the preexisting third work profile; and providing the second work affinity indicator to the user for optional consideration in making a decision regarding the third individual joining the team.

In one example, the method of the third aspect may include, for example, hiring the first individual for a new team and automatically identifying a predetermined number of other employees for the new team from among a pool of existing employees, the pool being larger than the predetermined number. The method further includes, for example, based on the first work profile of the first individual and a work profile of a next employee from the predetermined number of other employees, predicting a next work affinity indicator for the first individual and the next employee; repeating the predicting for each successive employee until no further employees from the pool remain; and providing best-fit work affinity indicators for the predetermined number of other employees to the user for optional consideration in choosing members of the new team.

FIGS. 4A-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Aspects of the present invention may be used by many types of computing environments. Another embodiment of a computing environment to incorporate and use one or more aspects of the present invention is described with reference to FIG. 4A. In this example, a computing environment 10 includes, for instance, a native central processing unit (CPU) 12 (or just CPU 12), a memory 14, adjunct processor(s) 15 and one or more input/output devices and/or interfaces 16 coupled to one another via, for example, one or more buses 18 and/or other connections. As examples, computing environment 10 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 12 includes one or more register 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 4A:
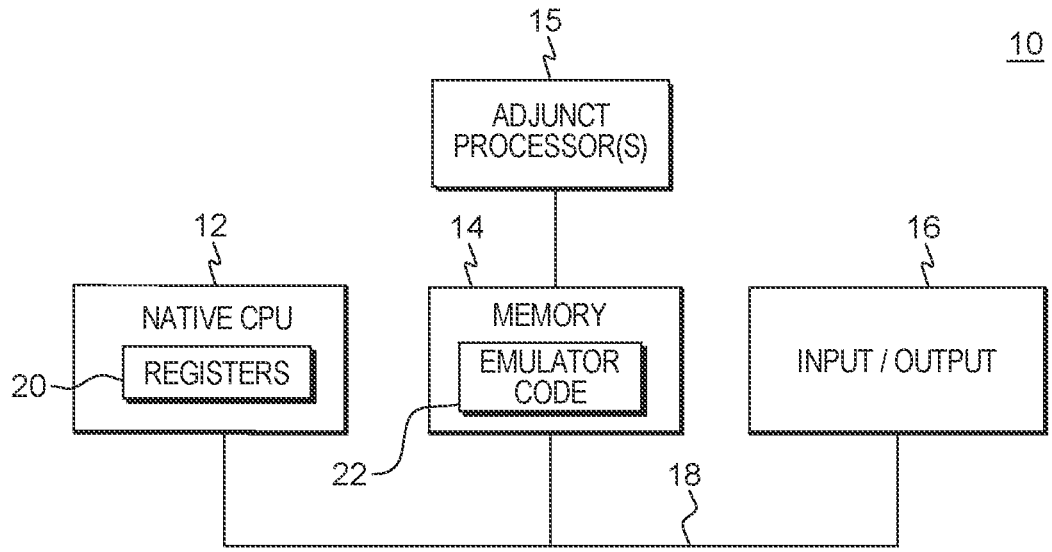
FIG. 4A is a block diagram of one example of a system that can be used, in accordance with one or more aspect of the present invention.
Figure 4B:
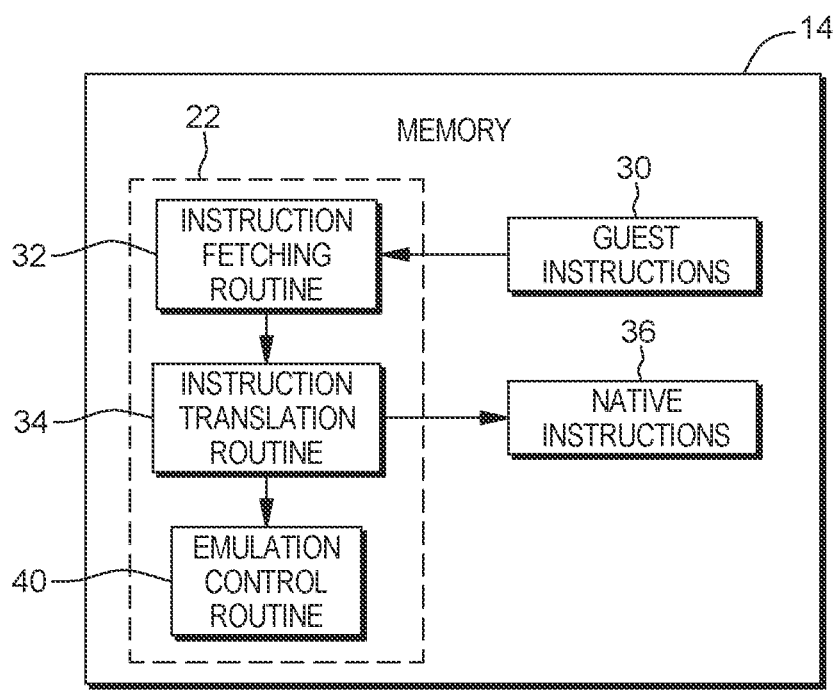
FIG. 4B depicts further details of the memory of FIG. 4A, in accordance with one or more aspects of the present invention.

Further details relating to emulator code 22 are described with reference to FIG. 4B. Guest instructions 30 stored in memory 14 comprise software instructions (e.g., correlating to machine instructions) that were developed to be executed in an architecture other than that of CPU 12. For example, guest instructions 30 may have been designed to execute on a processor based on the z/Architecture instruction set architecture, but instead, are being emulated on CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instruction 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

An instruction, command or call that may be emulated includes the Ultravisor Calls described herein, in accordance with one or more aspects of the present invention. Further, other instructions, commands, functions, operations, calls and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
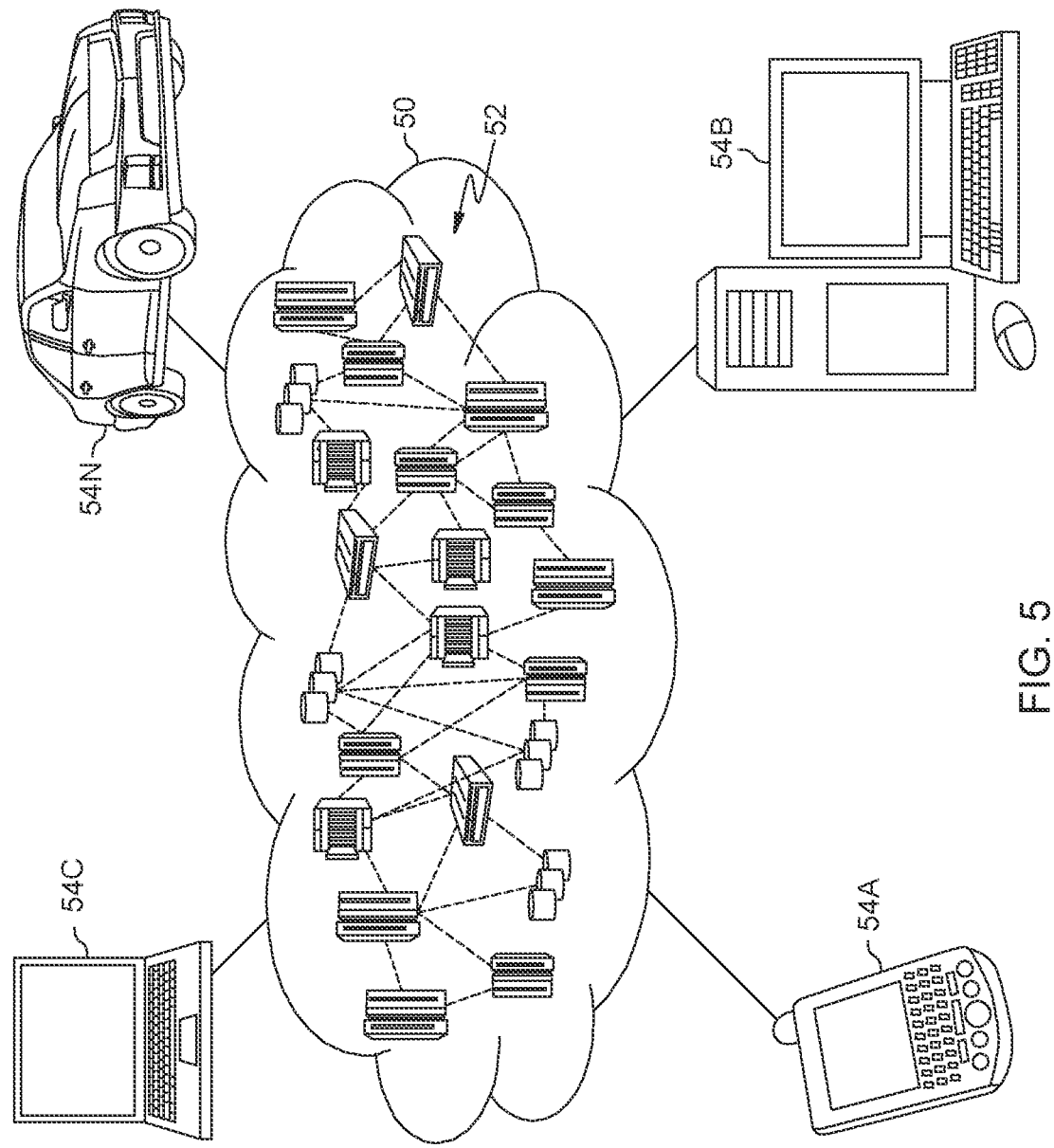
FIG. 5 depicts one embodiment of a cloud computing environment, in accordance with one or more aspects of the present invention.

Referring now to FIG. 5, one example of a cloud computing environment 50 is depicted. As shown, cloud computing environment 50 includes one or more cloud computing node 52 with which local computing devices used by cloud consumers, such as, for example, personal digital assistant (PDA) or cellular telephone 54A, desktop computer 54B, laptop computer 54C, and/or automobile computer system 54N may communicate. Node(s) 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 6:
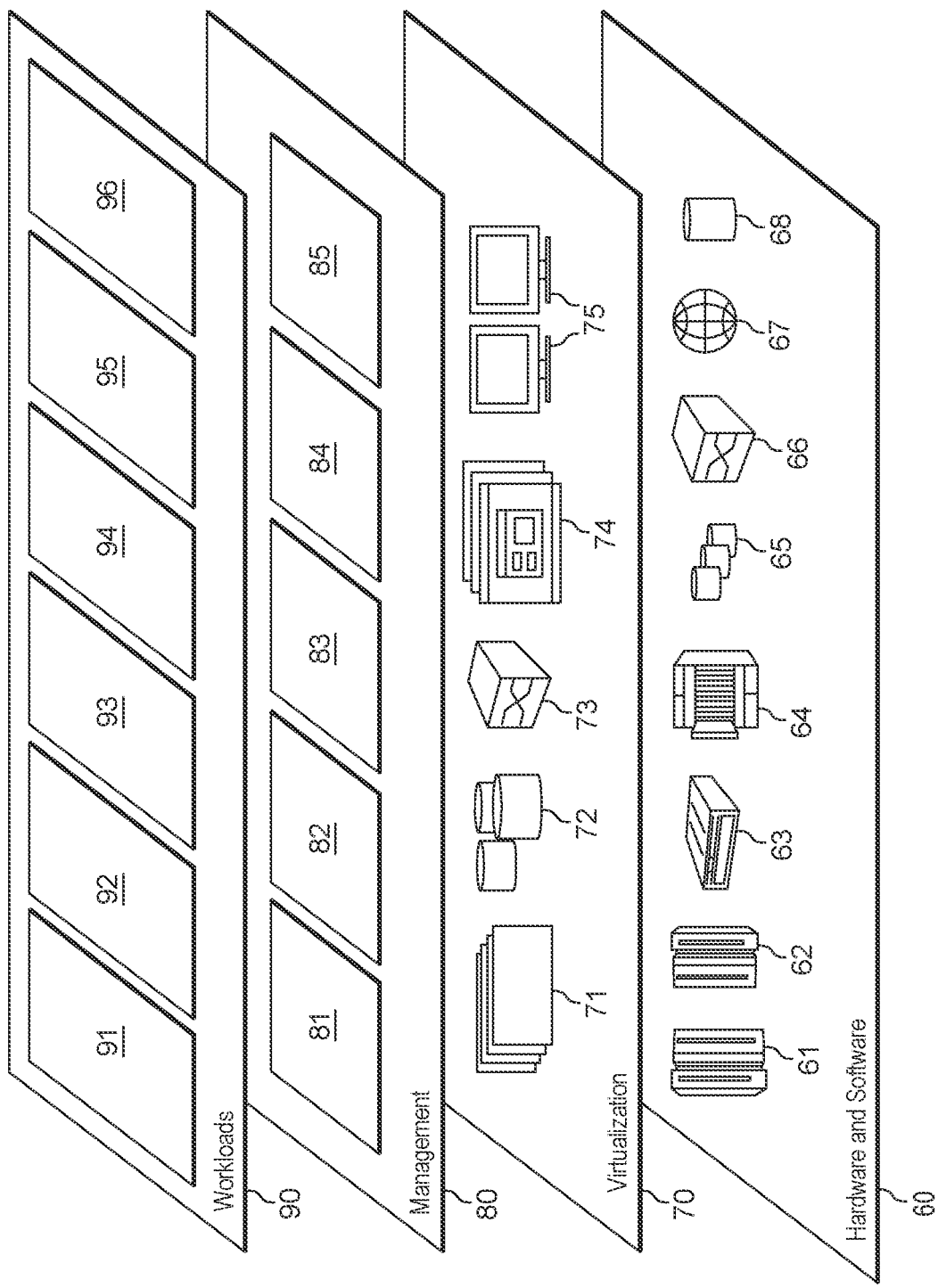
FIG. 6 depicts one example of abstraction model layers, in accordance with one or more aspects of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure virtual machine dump processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method, comprising:
receiving a plurality of personal inputs regarding a first individual after informed consent is given by the first individual;
automatically generating, using a computer processor, a first work profile for the first individual based on the plurality of personal inputs;
based on the first work profile of the first individual and a preexisting second work profile of a second individual, predicting a first work affinity indicator for the first individual and the second individual, wherein the predicting comprises using an affinity model trained via an ensemble learning process, wherein the affinity model includes a stacking model and wherein the ensemble learning process comprises receiving a set of training data, providing a plurality of instances of the set of training data to a plurality of base models, running each of the plurality of base models on a respective instance of the plurality of instances, resulting in a plurality of base model predictions, receiving, by the stacking model, the plurality of base model predictions, and running the stacking model on the plurality of base model predictions, thereby generating the first work affinity indicator, wherein running the stacking model includes bootstrap aggregating the plurality of base model predictions;
providing the first work affinity indicator to a user for optional consideration in making a work-related or employment-related decision;
subsequent to the first individual and the second individual beginning to work together as a team, a change occurring to at least one of the team and the at least one of the plurality of personal inputs;
based on the change being a change to the plurality of personal inputs, receiving an updated plurality of personal inputs regarding the first individual after renewed informed consent is given by the first individual;
automatically generating an updated first work profile based on the updated plurality of personal inputs;
based on the updated first work profile and the preexisting second work profile of the second individual, predicting an updated first work affinity indicator for the first individual and the second individual, wherein the predicting uses the affinity model trained via ensemble learning; and
providing the updated first work affinity indicator to the user for optional consideration in making an updated work-related or employment-related decision.

2. The computer-implemented method of claim 1, wherein the automatically generating comprises:
- determining a work style from the plurality of personal inputs; and
- automatically generating the first work profile based on the work style.

3. The computer-implemented method of claim 1, wherein the plurality of personal inputs comprises a plurality of feedback personal inputs and wherein subsequent to the first individual and the second individual beginning to work together as a team, the method further comprising assigning a task to the team, wherein the plurality of feedback personal inputs comprises an outcome of the task and at least one interaction satisfaction indicator for one or more of the first individual and the second individual.

4. The computer-implemented method of claim 1, the method further comprising, subsequent to the first individual and the second individual beginning to work together as a team, predicting a future change in the first work affinity indicator based on a historical trend in interactions between the first individual and the second individual.

5. The computer-implemented method of claim 1, further comprising:
- based on the change being a team change, receiving the first work profile of the first individual and a preexisting third work profile of a third individual;
- predicting a second work affinity indicator based on the first work profile and the preexisting third work profile; and
- providing the second work affinity indicator to the user for optional consideration in making a decision regarding the third individual joining the team.

6. The computer-implemented method of claim 1, wherein the work-related or employment-related decision comprises hiring the first individual for a new team, the method further comprising:
- automatically identifying a predetermined number of other employees for the new team from among a pool of existing employees, the pool being larger than the predetermined number;
- based on the first work profile of the first individual and a work profile of a next employee from the predetermined number of other employees, predicting a work affinity indicator for the first individual and the next employee;
- repeating the predicting for each successive employee from the predetermined number of other employees until no further employees remain; and
- providing best-fit work affinity indicators for the predetermined number of other employees to the user for optional consideration in choosing members of the new team.

7. The computer-implemented method of claim 1, wherein the personal inputs comprise a plurality of visual and verbal cues data, resulting in cues data, from an interaction between the first individual and the second individual in an environment, the method further comprising:
- correlating the cues data of the first individual and the second individual using Pearson's correlation coefficient;
- using a K nearest neighbors (KNN) classification algorithm, storing the cues data in a decentralized cloud object storage, providing the cues data to a KNN prediction algorithm and predicting, by the KNN prediction algorithm, one or more classification of the cues data;
- using a K-means metadata clustering algorithm, predicting one or more metadata cluster and an average of data points in each of the one or more metadata cluster, resulting in one or more average data point;
- based on the one or more classification of the cues data and the one or more average data point, mapping activity and characteristics of the first individual and the second individual to a plurality of variables of the environment, resulting in an affinity association; and
- providing the affinity association to a semi-supervised reinforcement learning model as part of the ensemble learning.

8. The computer-implemented method of claim 1, the method further comprising:
- subsequent to the first individual and the second individual beginning to work together as a team, a change occurring that results in a change to the first work affinity indicator;
- based on the change being a future change, predicting the future change to the first work affinity indicator based on a historical trend in interactions between the first individual and the second individual;
- based on the change being a change to the personal inputs, receiving an updated plurality of personal inputs regarding the first individual after renewed informed consent is given by the first individual;
- automatically generating an updated first work profile for the change to the personal inputs based on the updated plurality of personal inputs;
- based on the updated first work profile and a preexisting work profile of the second individual for the change to the personal inputs, predicting an updated first work affinity indicator for the first individual and the second individual, wherein the predicting uses the affinity model trained via ensemble learning;
- providing the updated first work affinity indicator to the user for optional consideration in making an updated work-related or employment-related decision;
- based on the change being a team change, receiving the first work profile of the first individual and a preexisting third work profile of a third individual previously having given informed consent;
- predicting a second work affinity indicator based on the first work profile and the preexisting third work profile; and
- providing the second work affinity indicator to the user for optional consideration in making a decision regarding the third individual joining the team.

9. The computer-implemented method of claim 1, wherein the work-related or employment-related decision comprises hiring at least three individuals for a new team and wherein the automatically generating comprises determining a work style for the first individual from the plurality of personal inputs and automatically generating the first work profile based on the work style, the method further comprising:
- automatically identifying a predetermined number of other employees for the new team from among a pool of existing employees, the pool being larger than the predetermined number;
- based on the first work profile of the first individual and a work profile of a first employee from the predetermined number of other employees, predicting the first work affinity indicator for the first individual and the first employee, wherein the affinity model comprises a stacking model and wherein the ensemble learning comprises:

receiving a set of training data;

providing a plurality of instances of the set of training data to a plurality of base models;

running each of the plurality of base models on a respective instance of the plurality of instances, resulting in a plurality of base model predictions;

receiving, by the stacking model, the plurality of base model predictions;

running the stacking model on the plurality of base model predictions, resulting in the first work affinity indicator;

based on the first work profile of the first individual and a work profile of a next employee from the predetermined number of other employees, predicting a next work affinity indicator for the first individual and the next employee;

repeating the predicting for each successive employee from the predetermined number of other employees until no further employees remain; and providing best-fit work affinity indicators for the predetermined number of other employees to the user for optional consideration in the hiring for the new team.

10. A system comprising:

a memory;

at least one processor in communication with the memory; and program instructions stored in the memory and executable by the at least one processor via the memory to perform a method comprising:

receiving a plurality of personal inputs regarding a first individual after informed consent is given by the first individual;

automatically generating a first work profile for the first individual based on the plurality of personal inputs;

based on the first work profile of the first individual and a preexisting second work profile of a second individual, predicting a first work affinity indicator for the first individual and the second individual, wherein the predicting comprises using an affinity model trained via an ensemble learning process, wherein the affinity model includes a stacking model and wherein the ensemble learning process comprises receiving a set of training data, providing a plurality of instances of the set of training data to a plurality of base models, running each of the plurality of base models on a respective instance of the plurality of instances, resulting in a plurality of base model predictions, receiving, by the stacking model, the plurality of base model predictions, and running the stacking model on the plurality of base model predictions, thereby generating the first work affinity indicator, wherein running the stacking model includes bootstrap aggregating the plurality of base model predictions;

providing the first work affinity indicator to a user for optional consideration in making a work-related or employment-related decision; and subsequent to the first individual and the second individual beginning to work together as a team, a change occurring to at least one of the team and the at least one of the plurality of personal inputs;

based on the change being a personal inputs change, receiving an updated plurality of personal inputs regarding the first individual after renewed informed consent is given by the first individual;

automatically generating an updated first work profile based on the updated plurality of personal inputs;

based on the updated first work profile and the preexisting second work profile of the second individual, predicting an updated first work affinity indicator for the first individual and the second individual, wherein the predicting uses the affinity model trained via ensemble learning; and providing the updated first work affinity indicator to the user for optional consideration in making an updated work-related or employment-related decision.

11. The system of claim 10, wherein the automatically generating comprises:

determining a work style from the plurality of personal inputs; and automatically generating the first work profile based on the work style.

12. The system of claim 10, wherein the plurality of personal inputs comprises a plurality of feedback personal inputs and wherein subsequent to the first individual and the second individual beginning to work together as a team, the method further comprising assigning a task to the team, wherein the plurality of feedback personal inputs comprises an outcome of the task and at least one interaction satisfaction indicator for one or more of the first individual and the second individual.

13. The system of claim 10, the method further comprising subsequent to the first individual and the second individual beginning to work together as a team, predicting a future change in the first work affinity indicator based on a historical trend in interactions between the first individual and the second individual.

14. The system of claim 10, further comprising:

based on the change being a team change, receiving the first work profile of the first individual and a preexisting third work profile of a third individual;

predicting a second work affinity indicator based on the first work profile and the preexisting third work profile; and providing the second work affinity indicator to the user for optional consideration in making an updated work-related or employment-related decision.

15. The system of claim 10, wherein the work-related or employment-related decision comprises hiring the first individual for a new team, the method further comprising:

automatically identifying a predetermined number of other employees for the new team from among a pool of existing employees, the pool being larger than the predetermined number;

based on the first work profile of the first individual and a work profile of a next employee from the predetermined number of other employees, predicting a work affinity indicator for the first individual and the next employee;

repeating the predicting for each successive employee from the predetermined number of other employees until no further employees remain; and providing best-fit work affinity indicators for the predetermined number of other employees to the user for optional consideration in choosing members of the new team.

16. A computer program product comprising:
a computer readable storage medium readable by one or more processing circuit and storing instructions for execution by one or more processor for performing a method comprising:
receiving a plurality of personal inputs regarding a first individual after informed consent is given by the first individual;
automatically generating a first work profile for the first individual based on the plurality of personal inputs;
based on the first work profile of the first individual and a preexisting second work profile of a second individual, predicting a first work affinity indicator for the first individual and the second individual, wherein the predicting comprises using an affinity model trained via an ensemble learning process, wherein the affinity model includes a stacking model and wherein the ensemble learning process comprises receiving a set of training data, providing a plurality of instances of the set of training data to a plurality of base models, running each of the plurality of base models on a respective instance of the plurality of instances, resulting in a plurality of base model predictions, receiving, by the stacking model, the plurality of base model predictions, and running the stacking model on the plurality of base model predictions, thereby generating the first work affinity indicator, wherein running the stacking model includes bootstrap aggregating the plurality of base model predictions;
providing the first work affinity indicator to a user for optional consideration in making a work-related or employment-related decision; and
subsequent to the first individual and the second individual beginning to work together as a team, a change occurring to at least one of the team and the at least one of the plurality of personal inputs;
based on the change being a change to the plurality of personal inputs, receiving an updated plurality of personal inputs regarding the first individual after renewed informed consent is given by the first individual;
automatically generating an updated first work profile based on the updated plurality of personal inputs;
based on the updated first work profile and the preexisting second work profile of the second individual, predicting an updated first work affinity indicator for the first individual and the second individual, wherein the predicting uses the affinity model trained via ensemble learning; and
providing the updated first work affinity indicator to the user for optional consideration in making an updated work-related or employment-related decision.

17. The computer program product of claim 16, wherein the automatically generating comprises:
determining a work style from the plurality of personal inputs; and
automatically generating the first work profile based on the work style.

* * * * *